United States Patent [19]

Nakayama et al.

[11] Patent Number: 5,638,354
[45] Date of Patent: Jun. 10, 1997

[54] OPTICAL INFORMATION RECORDING MEDIUM

[75] Inventors: Masahiko Nakayama, Yokohama; Hiroshi Koide, Machida; Akihiko Shimizu, Yokohama, all of Japan

[73] Assignee: Ricoh Company, Ltd., Tokyo, Japan

[21] Appl. No.: 276,518

[22] Filed: Jul. 15, 1994

[30] Foreign Application Priority Data

Jul. 16, 1993 [JP] Japan ................ 5-198934
Aug. 9, 1993 [JP] Japan ................ 5-214805
Dec. 22, 1993 [JP] Japan ................ 5-324109

[51] Int. Cl.$^6$ .................... G11B 7/00; G11B 7/24
[52] U.S. Cl. .................... 369/275.3; 369/44.26; 369/275.4
[58] Field of Search ............... 369/32, 275.3, 369/275.4, 13, 275.2, 44.26, 44.39, 44.34, 116, 54, 275.1, 277, 109, 100, 44.28; 360/78.08, 78.11

[56] References Cited

U.S. PATENT DOCUMENTS

| 5,128,916 | 7/1992 | Ito et al. ................. | 369/44.26 |
| 5,295,131 | 3/1994 | Ishibashi et al. ......... | 369/275.3 |
| 5,402,411 | 3/1995 | Maeda et al. ............. | 369/275.1 |
| 5,404,345 | 4/1995 | Taki ........................ | 369/44.26 |

FOREIGN PATENT DOCUMENTS 4195939  7/1992  Japan.

*Primary Examiner*—Ali Neyzari
*Attorney, Agent, or Firm*—Cooper & Dunham LLP

[57] ABSTRACT

In a control method of an optical disk unit, it is judged by performing a tentative tracking operation of an optical pickup in a constant region of an optical disk whether a tracking position of the optical pickup is located in a land or groove portion. After a correct tracking control condition is judged, an access operation according to command information is executed. The optical disk unit has a two-divisional light receiving element for receiving diffracted light caused by a pregroove and a prepit of the optical disk, and a differentiator for generating a difference signal between signals of this light receiving element. The optical disk unit further has an adder for generating a sum signal of the signals of the light receiving element, and a tracking signal selector for selecting the difference or sum signal when the tracking operation is performed in a pregroove or prepit region, respectively. An optical information recording medium and a method for recording and regenerating information by using this optical information recording medium are also shown.

9 Claims, 44 Drawing Sheets

Fig. 9

|  | POLARITY OF TRACKING ERROR SIGNAL | MOVING DIRECTION OF OPTICAL PICKUP |
|---|---|---|
| CONTROL MODE 1 | + | OUTER CIRCUMFERENTIAL SIDE |
|  | − | INNER CIRCUMFERENTIAL SIDE |
| CONTROL MODE 2 | + | INNER CIRCUMFERENTIAL SIDE |
|  | − | OUTER CIRCUMFERENTIAL SIDE |

OPTICAL INFORMATION RECORDING MEDIUM

BACKGROUND OF THE INVENTION

1. Field of the Invention

The present invention relates to an optical disk unit which uses an optical disk having a track guide groove and has a function for getting access to both a land portion and a groove portion of this optical disk. The present invention also relates to a method for controlling an operation of this optical disk unit. The present invention also relates to an optical disk having pregrooves and prepits for tracking formed in different positions of central lines, and an optical disk unit capable of regenerating a prepit of the optical disk and stably performing a tracking operation. The present invention further relates to an optical information recording medium such as an optical disk, an optical card, an optical tape, etc. for recording and regenerating information by using a laser converging beam, and a method for recording and regenerating information by using this optical information recording medium.

2. Description of the Related Art

In the case of an optical disk having a track guide groove, information is generally recorded to any one of a groove portion as the track guide groove and a land portion arranged between groove portions.

In contrast to this, for example, information is recorded to both the land and groove portions to double a recording capacity of the optical disk in Japanese Patent Application Laying Open (KOKAI) No. 4-195939.

In the optical disk, it is necessary to record address information by a prepit in advance every information sector.

In the above proposed optical disk, this prepit is formed in a boundary portion between the land and groove portions. Thus, the same address information is read when an optical pickup tracks the land portion and gets access to the land portion and the optical pickup tracks the groove portion and gets access to the groove portion.

A track number and a sector number are recorded to an address portion. An optical disk unit discriminates object sectors from each other by this information.

In the above construction, the same sector number is provided to each of the land and groove portions. Accordingly, when the optical pickup gets access to the optical disk, the land and groove portions must be correctly discriminated from each other.

A push-pull method using a diffraction phenomenon of light reflected on each of the land and groove portions is often used in tracking control of the optical disk. A tracking error signal obtained by this push-pull method shows a level "0" when there is no tracking shift. The tracking error signal shows a level "+" when there is a tracking shift on one side. The tracking error signal shows a level "−" when there is a tracking shift on the other side. Positive and negative polarities of this tracking error signal in tracking of the optical pickup in the land and groove portions are inverted to each other.

When the tracking error signal shows the level "+", the optical pickup is moved onto an outer circumferential side or an inner circumferential side of the optical disk in a tracking control condition. Tracking operations of the optical pickup in the land and groove portions can be easily switched by changing only this tracking control condition.

However, for example, when the optical pickup concretely tracks the land portion, setting of the above tracking control condition is determined by an electric circuit arranged in an optical disk unit. Accordingly, tracking control conditions in optical disk units are different from each other.

Therefore, for example, there is a setting error possibility that a tracking control condition is set by a user to record information to the land portion, but this information is really recorded to the groove portion. In this case, when information is recorded to the groove portion, this recorded information is destructed.

As mentioned above, in the case of the general optical disk using both the land and groove portions, the optical pickup tends to get access to each of the land and groove portions in error.

In a general known optical disk unit, document information, etc. are recorded onto an optical disk as a digital signal and are regenerated from the optical disk in accordance with necessity. A pregroove for tracking as a guide groove is formed in such an optical disk. Information is recorded to a land between guide grooves.

For example, in an optical disk shown in Japanese Patent Application Laying Open (KOKAI) No. 4-195939, information is recorded to both a land and a pregroove since no recording density can be increased by a recording operation using only the land. A prepit is formed in a central portion between the land and the pregroove. Thus, the same prepit can be read when the pregroove and the land are tracked.

However, when a regenerating operation, etc. of the above optical disk are performed, a portion of the prepit is formed in the pregroove in a prepit region. Therefore, a tracking signal is greatly disturbed when an optical pickup is moved from a pregroove region to the prepit region, or is moved from the prepit region to the pregroove region. Accordingly, the tracking operation becomes unstable so that there is a fear of dislocation of a tracking position of the optical pickup.

Further, the pregroove is formed in the prepit region of the above optical disk so that two laser beams are required to simultaneously form the prepit and the pregroove. Therefore, it is considered to remove the pregroove from the prepit region and form the prepit region by one laser beam. However, in this case, the following problems are caused.

FIG. 1 shows the relation between a tracking signal and a beam locus in a beam scanning direction when the optical pickup tracks a pregroove. As shown in FIG. 1, a tracking signal is greatly disturbed when the optical pickup is moved from a pregroove region to a prepit region, or is moved from the prepit region to the pregroove region. Accordingly, a tracking operation becomes unstable. Therefore, there is a case in which a tracking position of the optical pickup is dislocated from a normal track. Further, the amplitude of a regenerating signal of a prepit shifted from the position of a first prepit beam is greatly different from the amplitude of a regenerating signal of a prepit unshifted from the position of an intermediate prepit beam. In FIG. 1, reference numerals G and L respectively designate a groove and a land.

FIG. 2 shows the relation between switching timing of tracking polarities and a beam locus in a beam scanning direction when the optical pickup tracks the land. As shown in FIG. 2, it is necessary to switch the tracking polarities in pregroove and prepit regions at a land tracking time so as to read the same prepit in a pregroove G and a land L. If no tracking polarities are switched, the optical pickup is separated from a desirable prepit. In this case, each of the tracking polarities shows a tracking operation at a zero crossing point of a difference signal (a tracking signal)

shown in each of FIGS. 16 and 17 in a rightward or leftward rising direction.

In a general known optical information recording medium, guide grooves each having a depth of about ⅛ times a wavelength of recorded and regenerated light are formed on a surface of a transparent disk substrate. A prepit series is formed in a land between these guide grooves. A light absorption reflective recording film is formed on this prepit series and information can be recorded to this light absorption reflective recording film by a laser converging beam. In this recording medium, the laser converging beam is diffracted by a diffracting action of a guide groove. A tracking shift is detected by detecting a distribution of light reflected on this groove. A tracking operation is controlled on the basis of the tracking shift. Further, irregular prepit information is read and a recording pit is formed in the recording film in association with the prepit information.

However, in the optical information recording medium of such a type, only one of the groove and the land can be used to perform the tracking operation. Therefore, it is difficult to increase a recording density of information. The tracking operation can be performed in the groove or the land by only inverting a tracking polarity. However, when the prepit series is located in only the land as mentioned above, no prepit having recorded address information, etc. can be read by tracking the groove. Therefore, no additional recording pit can be formed in association with the prepit information so that no information recording density can be increased.

To solve this problem, inventors of this application proposed a novel optical information recording medium in Japanese Patent Application Laying Open (KOKAI) No. 4-195939. As shown in FIG. 3, this recording medium has a groove 103 and a series of prepits 104 for tracking. When a groove clearance as a track pitch is set to P, the prepit series is formed such that a central line of the prepit series is approximately shifted from that of the groove by P/4 on one of left-hand and right-hand sides. An unillustrated light absorption reflective optical recording film is formed on an information recording face of this recording medium. A laser converging beam 106 is irradiated onto this optical recording film. While an intermediate portion of the groove 103 or the land 102 is tracked, the above prepit series is regenerated and information is recorded on the basis of this regeneration. In FIG. 3, reference numerals 101 and 105 respectively designate a disk substrate and a recording pit.

However, the following problems to be improved are caused with respect to the optical information recording medium proposed in the above Japanese laid-open patent and a method for recording and regenerating information by using this optical information recording medium.

(1) As illustrated in FIG. 3 showing the recording medium, the prepit series is located between the groove and the land so that a prepit has an asymmetrical shape. When the tracking operation is performed between the groove and the land, an offset voltage is generated with respect to a push-pull signal. Therefore, it is difficult to accurately perform the tracking operation along the prepit series.

(2) As mentioned above, the prepit has an asymmetrical shape and a considerably complicated sectional shape. Therefore, when a polycarbonate substrate (called a PC substrate in the following description) manufactured by an injection molding method is used as a substrate of the recording medium, no prepit shape of a stamper can be accurately transferred to the substrate when this substrate is manufactured. As a result, there is a possibility of an error in regeneration of preformat information constructed by the prepit series because of a transfer defect. Further, no information can be accurately recorded to a data region constructed by a groove and a land adjacent to the prepit series.

(3) Further, as shown in FIG. 3, a groove is adjacent to a prepit so that an amount of reflected light is greatly reduced in comparison with a case in which the prepit is independently formed. As a result, there is a problem that the amplitude of a signal of the prepit series optically obtained from the prepit by using the laser converging beam is small.

SUMMARY OF THE INVENTION

It is therefore a first object of the present invention to provide an optical disk unit and a control method thereof in which no optical pickup gets access to each of land and groove portions in error.

A second object of the present invention is to provide an optical disk having pregrooves and prepits for tracking formed in different positions of central lines, and an optical disk unit capable of regenerating a prepit of the optical disk and stably performing a tracking operation.

A third object of the present invention is to provide an optical information recording medium in which information can be recorded and regenerated by tracking both a groove and a land, and a crosstalk signal from an adjacent track can be reduced and no offset voltage is caused with respect to a push-pull signal when preformat information constructed by a prepit formed within the recording medium is regenerated.

A fourth object of the present invention is to provide an optical information recording medium in which an irregular shape formed by a groove and a prepit can be accurately transferred to a substrate of the optical information recording medium in the above third object when this substrate is manufactured by an injection molding method.

A fifth object of the present invention is to provide an optical information recording medium for sufficiently greatly amplifying the amplitude of a prepit signal optically detected from a prepit, and accurately regenerating and demodulating the prepit signal.

A sixth object of the present invention is to provide an optical information recording medium in which a difference in signal output value optically detected from a groove or a land can be reduced between the groove and the land.

A seventh object of the present invention is to provide an optical information recording medium having a preformat construction for accurately detecting the position of a preformat region.

An eighth object of the present invention is to provide a recording-regenerating method for performing a tracking servo operation in which a data region constructed by a groove and a land can be accurately tracked and preformat information constructed by a prepit series can be accurately regenerated and demodulated.

A ninth object of the present invention is to provide a recording-regenerating method for accurately switching tracking servo operations at preferable timing in a data region and a preformat region.

A tenth object of the present invention is to provide an original board exposure apparatus for accurately setting arranging positions and groove shapes of a groove and a prepit when a stamper for manufacturing a polycarbonate substrate for the above optical information recording medium is exposed as an original board.

In accordance with a first construction of the present invention, the above first object can be achieved by a control method of an optical disk unit having a function in which an optical pickup selectively tracks a land or groove portion of an optical disk by switching two tracking control conditions and gets access to both the land and groove portions. The control method comprises the steps of making the optical pickup tentatively track the land or groove portion in a constant region of the optical disk; judging whether a tracking position of the optical pickup is located in the land or groove portion; judging whether each of the tracking control conditions corresponds to the tracking position; making the optical pickup track the land or groove portion in a corresponding tracking control condition when the optical disk unit receives command information indicative of access to the land or groove portion; and executing an operation for recording and regenerating information.

In accordance with a seventh construction of the present invention, the above first object can be also achieved by an optical disk unit having a function in which an optical pickup selectively tracks a land or groove portion of an optical disk by switching two tracking control conditions and gets access to both the land and groove portions; the optical disk unit comprising means for making the optical pickup tentatively track the land or groove portion in a constant region of the optical disk; means for judging whether a tracking position of the optical pickup is located in the land or groove portion; means for judging whether each of the tracking control conditions corresponds to the tracking position; means for making the optical pickup track the land or groove portion in a corresponding tracking control condition when the optical disk unit receives command information indicative of access to the land or groove portion; and means for executing an operation for recording and regenerating information.

In the above control method and the above optical disk unit, it is judged by the tentative tracking operation whether a tracking control condition corresponds to the tracking position. The optical pickup then gets access to the optical disk in accordance with command information. Accordingly, it is possible to prevent the optical pickup from getting access to each of the land and groove portions in error.

In accordance with an eighth construction of the present invention, the above second object can be achieved by an optical disk unit for recording or regenerating information by irradiating a small light spot onto an optical disk constructed by a pregroove and a prepit for tracking formed in different positions of central lines; the optical disk unit comprising a two-divisional light receiving element for receiving diffracted light caused by the pregroove and the prepit of the optical disk; a differentiator for generating a difference signal between signals obtained from this two-divisional light receiving element; an adder for generating a sum signal of these signals obtained from the two-divisional light receiving element; and tracking signal selecting means for selecting the difference signal when a tracking operation is performed in a pregroove region; the tracking signal selecting means selecting the sum signal when the tracking operation is performed in a prepit region.

In accordance with a tenth construction of the present invention, the above second object can be also achieved by an optical disk having a pregroove and a prepit for tracking and constructed such that the prepit having the same pattern as an adjacent prepit is arranged on an extension line of the pregroove in a prepit region; and prepits having a pattern different from that of the adjacent prepit are shifted from each other by ¼ times a pitch of the pregroove.

In the optical disk unit of the present invention, diffracted light caused by the optical disk is received by the two-divisional light receiving element and is converted to electric signals. Next, difference and sum signals of these converted signals are respectively generated by the differentiator and the adder. The difference signal is selected by the tracking signal selecting means when the tracking operation is performed in the pregroove region. The sum signal is selected by the tracking signal selecting means when the tracking operation is performed in the prepit region. Thus, the tracking operation is stably performed.

The above third to tenth objects of the present invention can be achieved by the following eleventh to twenty-fifth constructions.

Namely, the eleventh construction of the present invention resides in an optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series.

The seventeenth construction of the present invention resides in a method for recording and regenerating information by using an optical information recording medium; the optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series; the recording-regenerating method comprising the steps of scanning a laser converging beam on a central line of a groove or a land while a tracking servo operation is performed when information is regenerated in a data region constructed by the groove or the land; stopping the tracking servo operation approximately in a switching portion from the data region to the preformat region when information is regenerated in the preformat region constructed by the prepit series; scanning the laser converging beam while the tracking servo operation is again performed after the laser converging beam has been shifted to a center of the prepit series; stopping the tracking servo operation approximately in a switching portion from the preformat region to the data region; and scanning the laser converging beam while the tracking servo operation is performed after the laser converging beam has been shifted to a center of the groove or the land.

The nineteenth construction of the present invention resides in a method for recording and regenerating information by using an optical information recording medium; the optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series; the recording-regenerating method comprising the steps of scanning a laser converging beam on a central line of a groove or a land while a tracking servo operation is performed when information is regenerated in a data region constructed by the groove or the land; stopping the tracking servo operation approximately in a switching portion from the data region to the preformat region when information is regenerated in the preformat region constructed by the prepit series; scanning the laser converging beam without performing the tracking servo operation after the laser converging beam is shifted to a center of the prepit series; and scanning the laser converging beam approximately in a switching portion from the preformat region to the data region while the tracking servo operation is performed after the laser converging beam has been shifted to a center of the groove or the land.

The twenty-first construction of the present invention resides in a method for recording and regenerating information by using an optical information recording medium; the optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series; the recording-regenerating method comprising the steps of scanning a laser converging beam on a central line of a groove or a land while a tracking servo operation is performed when information is regenerated in a data region constructed by the groove or the land; stopping the tracking servo operation approximately in a switching portion from the data region to the preformat region when information is regenerated in the preformat region constructed by the prepit series; scanning the laser converging beam in a state in which the laser converging beam is fixed onto the central line of the groove or the land; and scanning the laser converging beam while the tracking servo operation is again performed approximately in a switching portion from the preformat region to the data region.

The twenty-third construction of the present invention resides in an original board exposure apparatus for manufacturing a stamper for manufacturing a substrate used for an optical information recording medium by an injection molding method; the optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series; the original board exposure apparatus comprising:

(1) a system for forming one laser converging beam for exposing a groove and a prepit as an original board;

(2) a signal modulator for irradiating and interrupting the laser converging beam on an optical path thereof in conformity with a pattern of each of the groove and the prepit;

(3) a light amount modulator for adjusting a light intensity of the laser converging beam on the optical path thereof in conformity with the pattern of each of the groove and the prepit; and (4) an optical deflector for shifting a position of the laser converging beam by P/4 on the optical path thereof.

The twenty-fourth construction of the present invention resides in an original board exposure apparatus for manufacturing a stamper for manufacturing a substrate used for an optical information recording medium by an injection molding method; the optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series; the original board exposure apparatus comprising:

(1) a system for forming a first laser converging beam for exposing a groove as an original board and a second laser converging beam for exposing a prepit as the original board;

(2) a signal modulator for irradiating and interrupting the first laser converging beam on an optical path thereof in conformity with an intermittent groove pattern;

(3) a light amount modulator for adjusting a light intensity of the first laser converging beam on the optical path thereof;

(4) an optical deflector for adjusting and setting a distance between the first and second laser converging beams to P/4 on a laser converging face and arranged on the optical path of the first or second laser converging beam;

(5) a signal modulator for irradiating and interrupting the second laser converging beam on the optical path thereof in conformity with a pattern of the prepit series; and (6) a light amount modulator for adjusting a light intensity of the second laser converging beam on the optical path thereof.

The twenty-fifth construction of the present invention resides in an original board exposure apparatus for manufacturing a stamper for manufacturing a substrate used for an optical information recording medium by an injection molding method; the optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series; the original board exposure apparatus comprising:

(1) a system for forming a first laser converging beam for exposing a groove, a preformat mark and a prepit series as an original board, the preformat mark being constructed by the prepit series on a central line of the groove;

the prepit series being shifted from the central line of the groove by P/4;

this system further forming a second laser converging beam for exposing the preformat mark constructed by the prepit series on the central line of a land as the original board;

(2) a signal modulator for irradiating and interrupting the first laser converging beam on an optical path thereof in conformity with each of intermittent groove and prepit patterns;

(3) a light amount modulator for adjusting a light intensity of the first laser converging beam on the optical path thereof;

(4) means for adjusting and setting a distance between the first and second laser converging beams to P/2 on a laser converging face;

(5) an optical deflector for shifting the first laser converging beam on the optical path thereof by P/4 on the laser converging face;

(6) a signal modulator for irradiating and interrupting the second laser converging beam on an optical path thereof in conformity with a pattern of the prepit series; and (7) a light amount modulator for adjusting a light intensity of the second laser converging beam on the optical path thereof.

In accordance with the above eleventh to twenty-fifth constructions, the following effects can be obtained.

As shown by the third object of the present invention, information can be recorded and regenerated by tracking both a groove and a land, and a crosstalk signal from an adjacent track can be reduced and no offset voltage is caused with respect to a push-pull signal when preformat information constructed by a prepit formed within the recording medium is regenerated.

As shown by the fourth object of the present invention, an irregular shape formed by a groove and a prepit can be accurately transferred to a substrate of the optical information recording medium in the above third object when this substrate is manufactured by an injection molding method.

As shown by the fifth object of the present invention, it is possible to sufficiently greatly amplify the amplitude of a prepit signal optically detected from a prepit, and accurately regenerate and demodulate the prepit signal.

As shown by the sixth object of the present invention, a difference in signal output value optically detected from a groove or a land can be reduced between the groove and the land.

As shown by the seventh object of the present invention, it is possible to provide a preformat construction for accurately detecting the position of a preformat region.

As shown by the eighth object of the present invention, it is possible to perform a tracking servo operation in which a data region constructed by a groove and a land can be accurately tracked and preformat information constructed by a prepit series can be accurately regenerated and demodulated.

As shown by the ninth object of the present invention, it is possible to accurately switch tracking servo operations at preferable timing in a data region and a preformat region.

As shown by the tenth object of the present invention, the original board exposure apparatus can accurately set arranging positions and groove shapes of a groove and a prepit when a stamper for manufacturing a polycarbonate substrate for the above optical information recording medium is exposed as an original board.

Further objects and advantages of the present invention will be apparent from the following description of the preferred embodiments of the present invention as illustrated in the accompanying drawings.

BRIEF DESCRIPTION OF THE DRAWINGS

FIG. 9 is a view for explaining a tracking control mode;

Figure 10A:
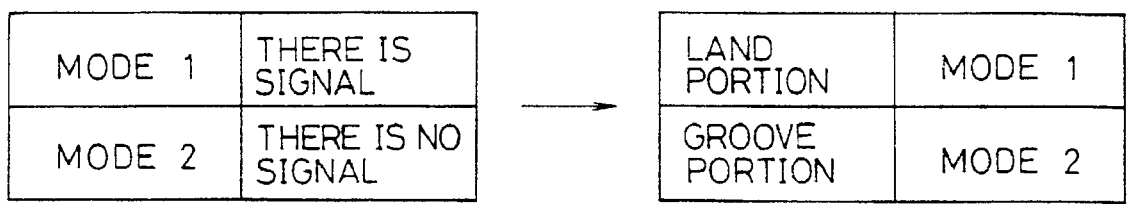
Figure 10B:
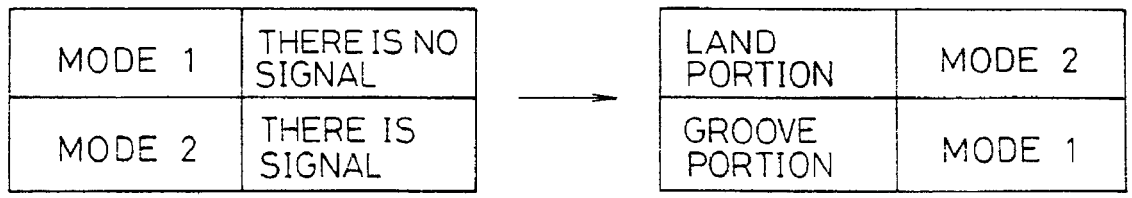
Figure 11:
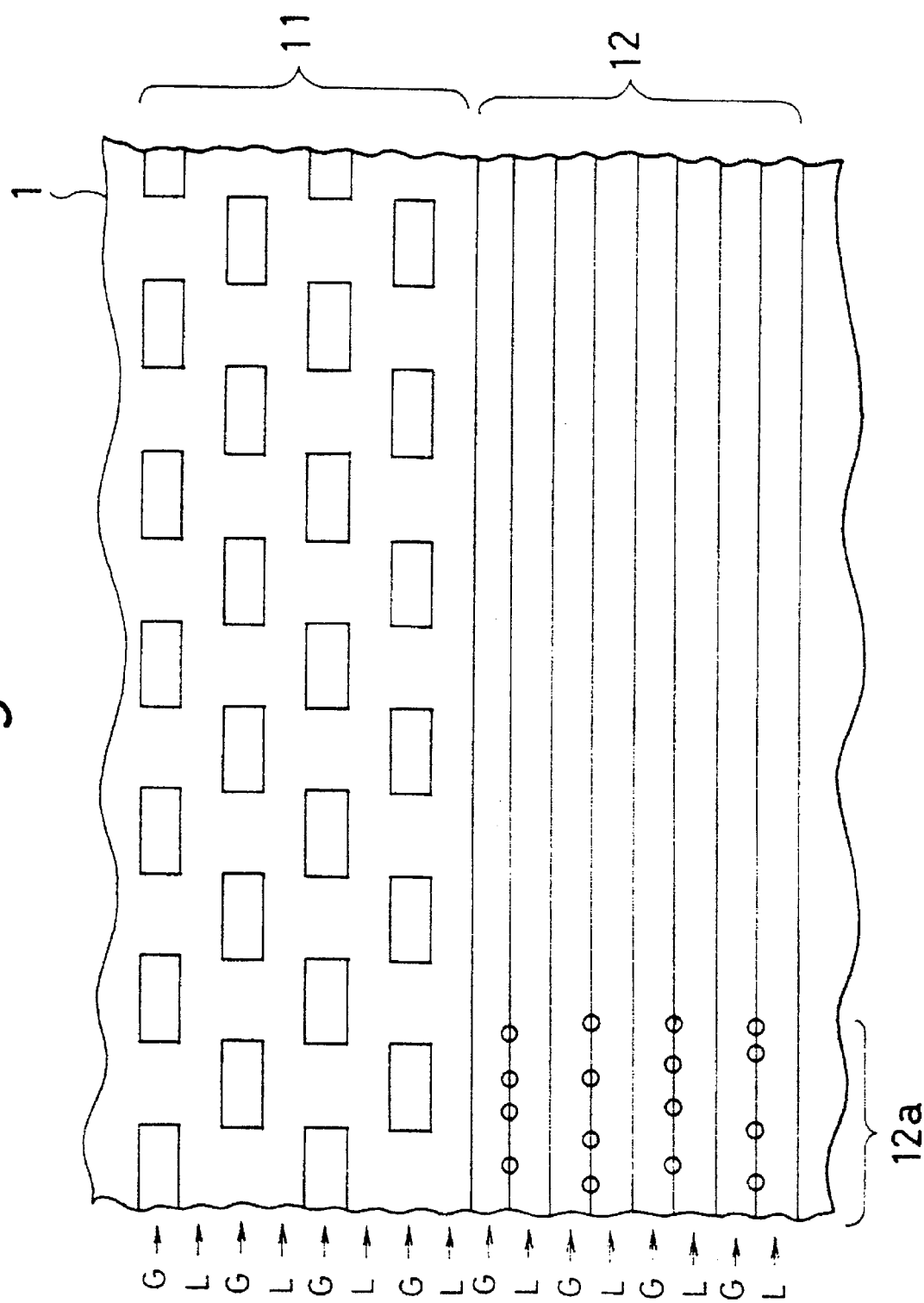
Figure 12A:
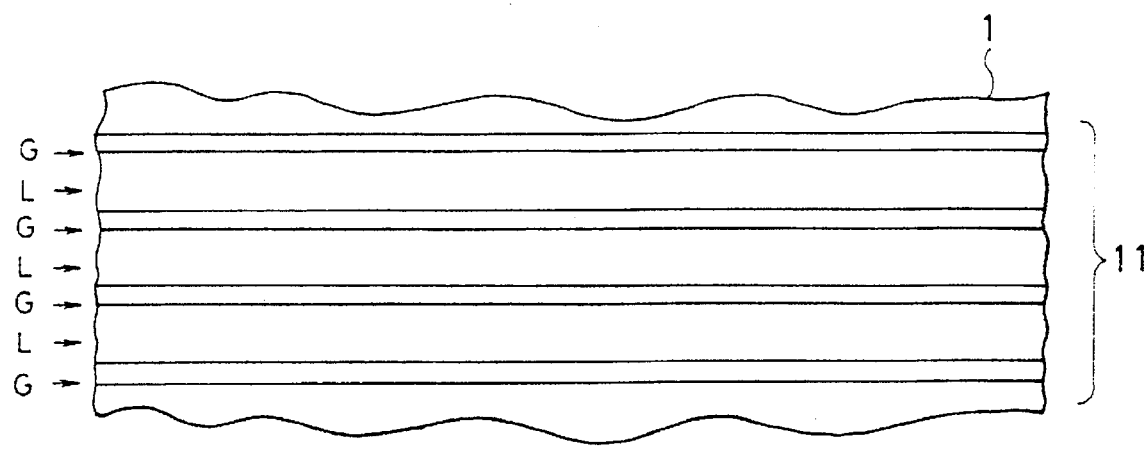
Figure 12B:
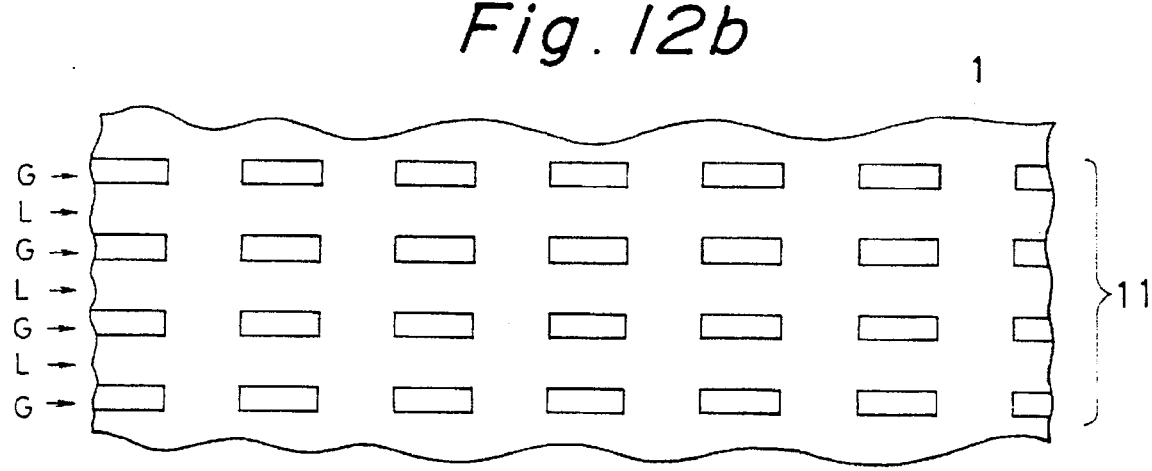
Figure 13:
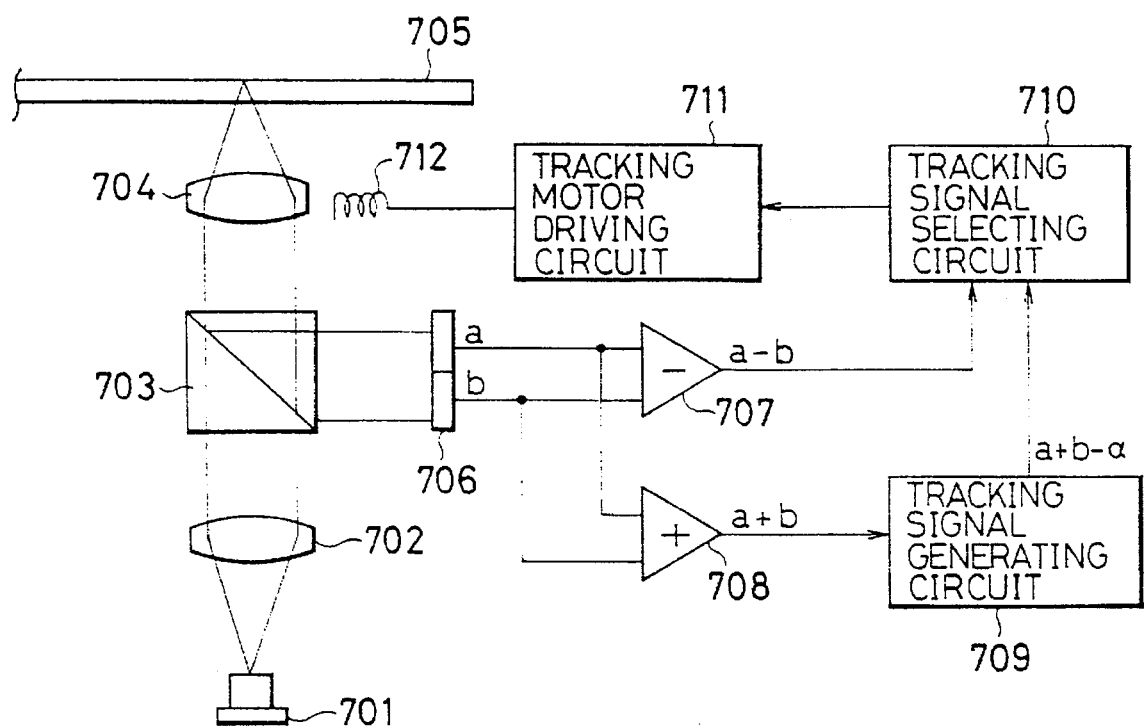
Figure 14:
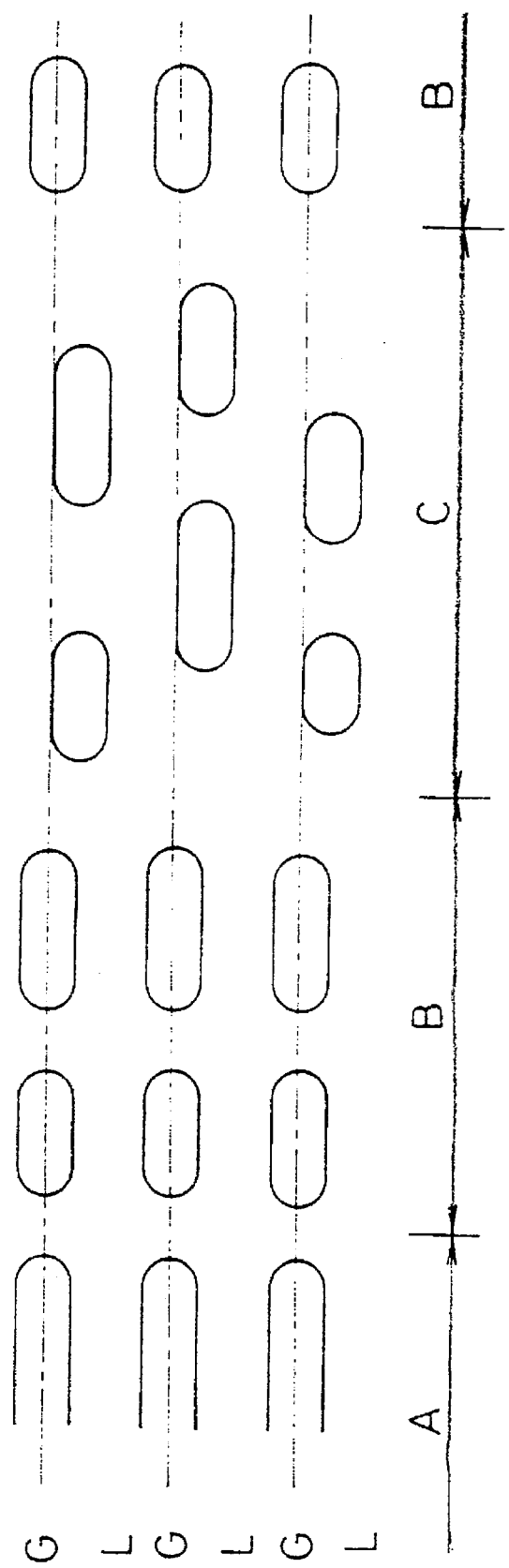
Figure 15:
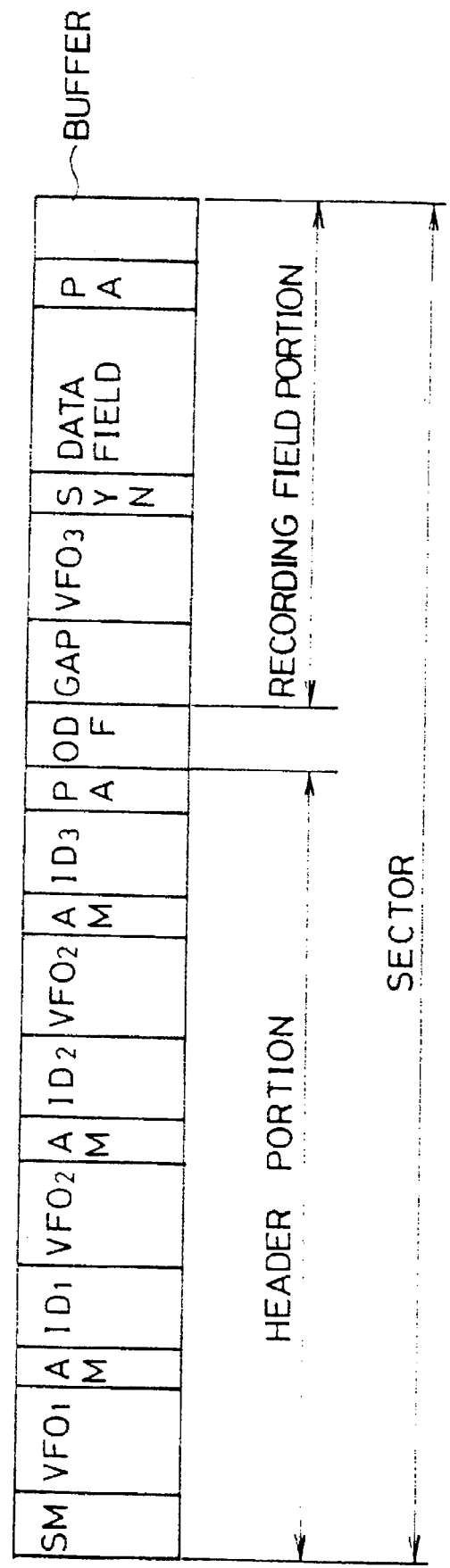
Figure 16:
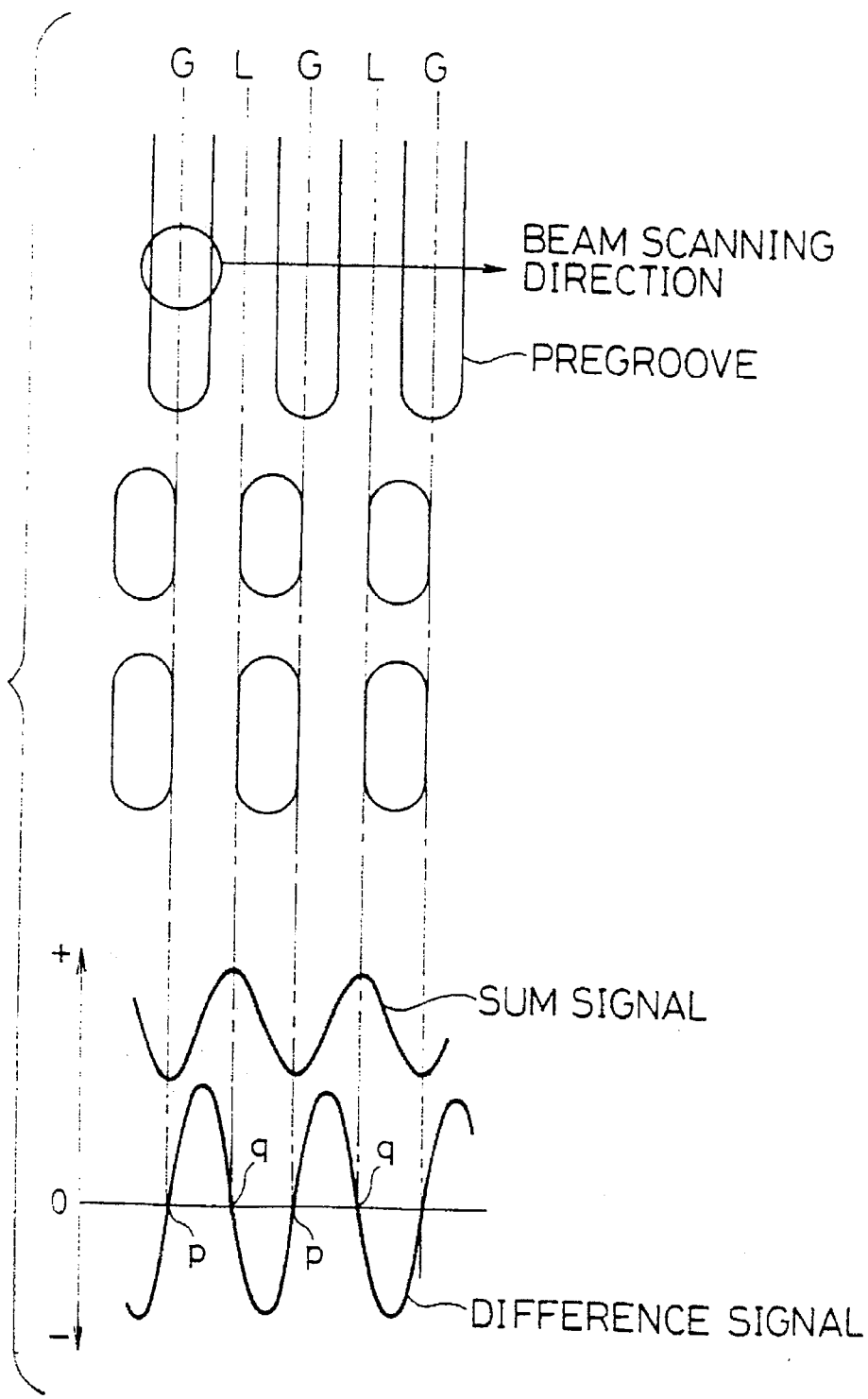
Figure 17:
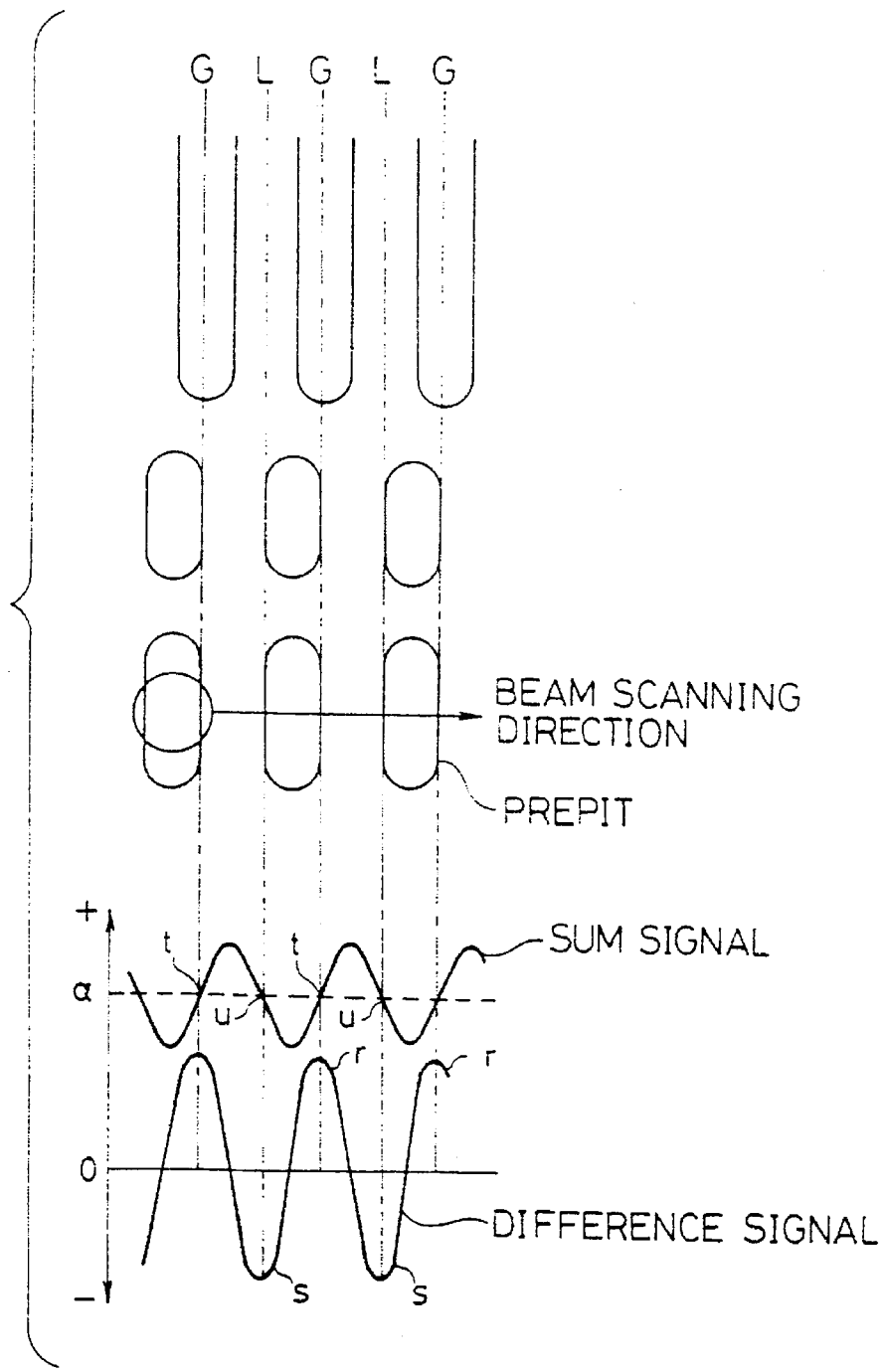
Figure 18:
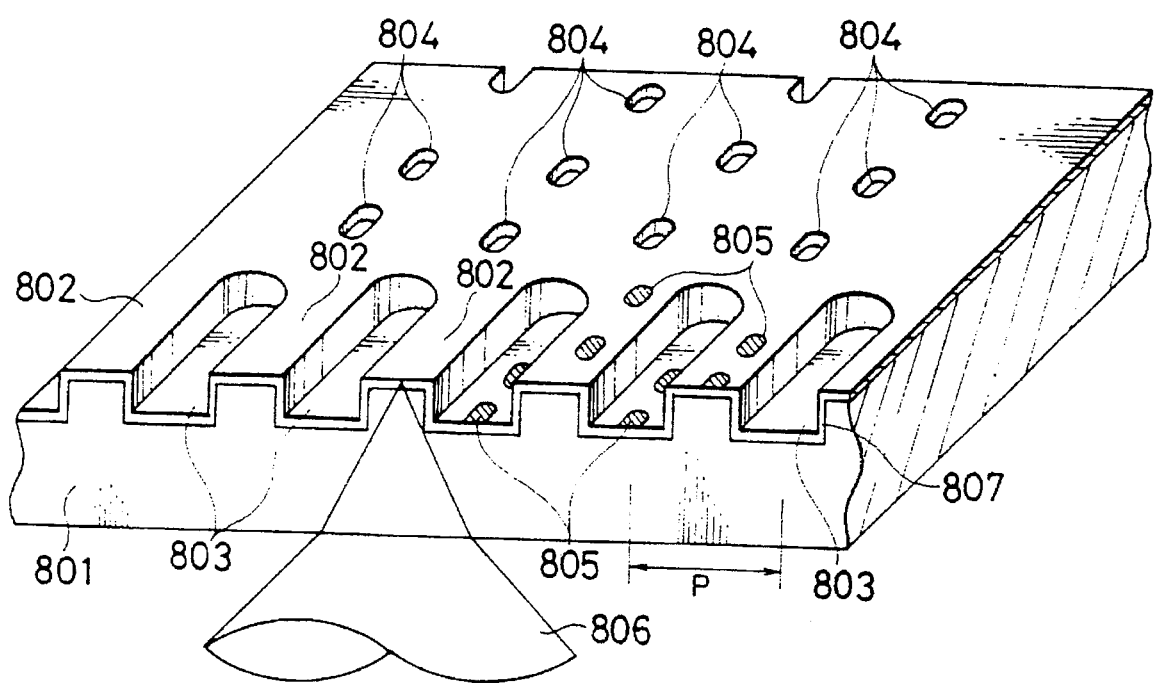
Figure 19:
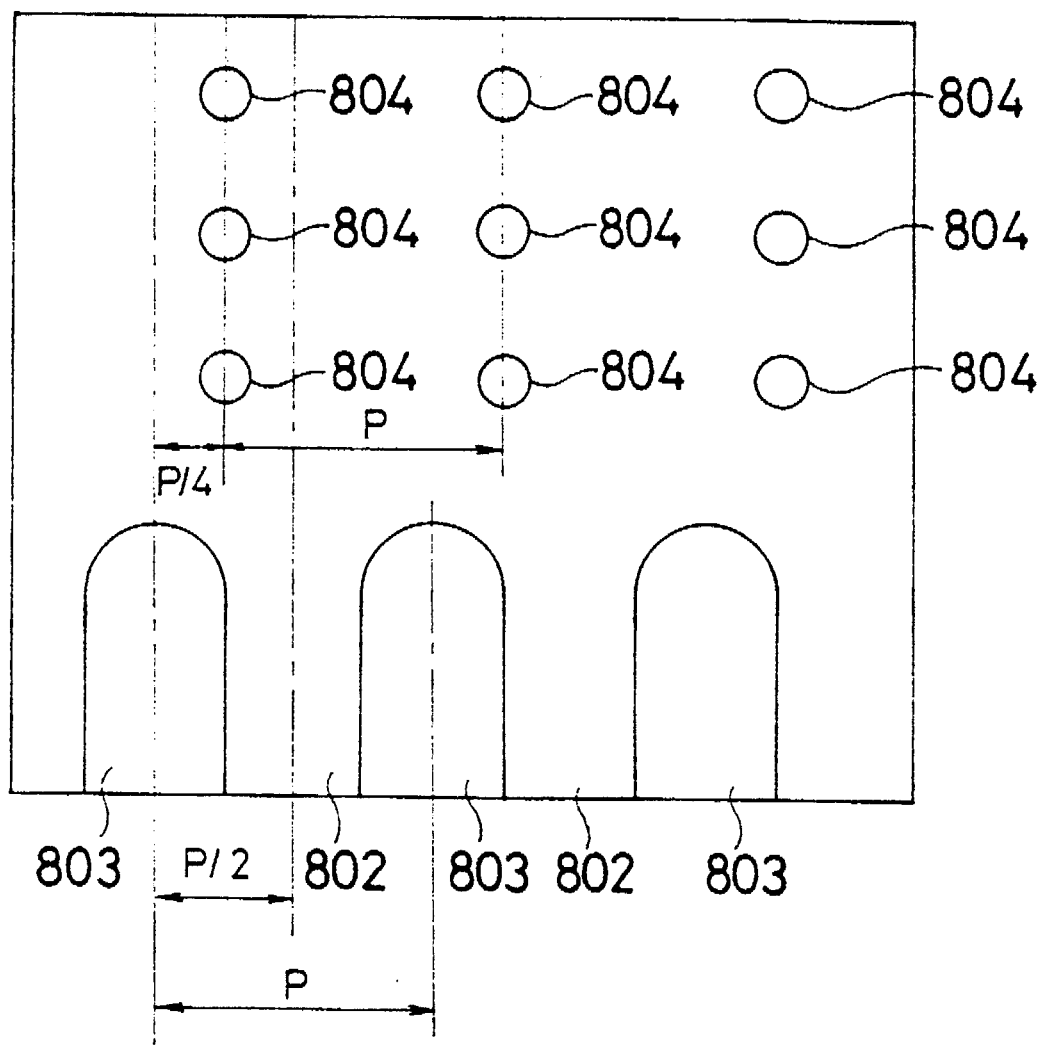
Figure 21A:
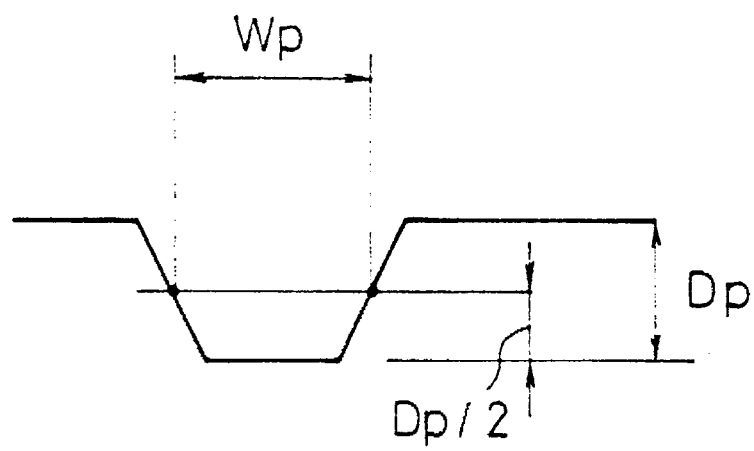
Figure 21B:
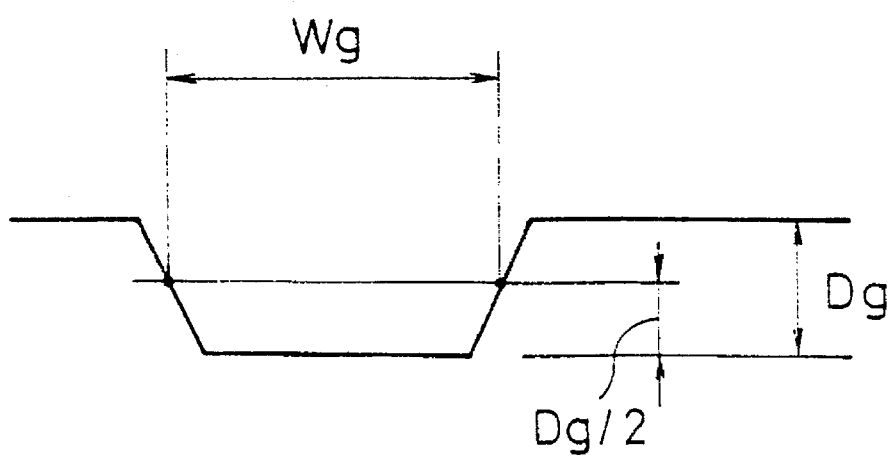
Figure 22A:
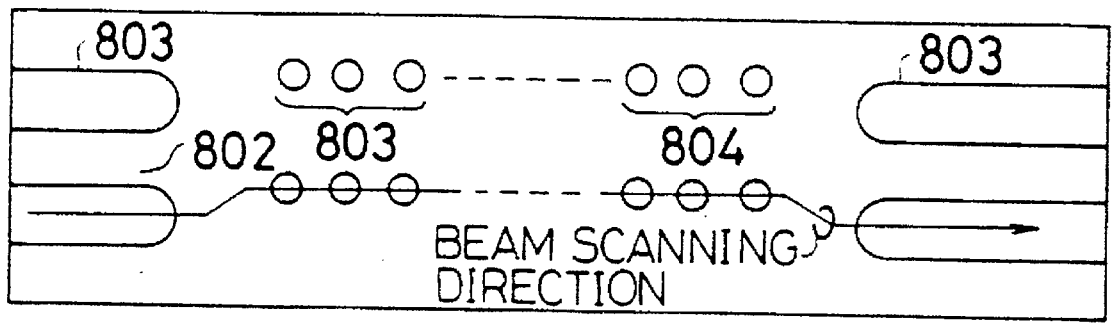
Figure 22B:
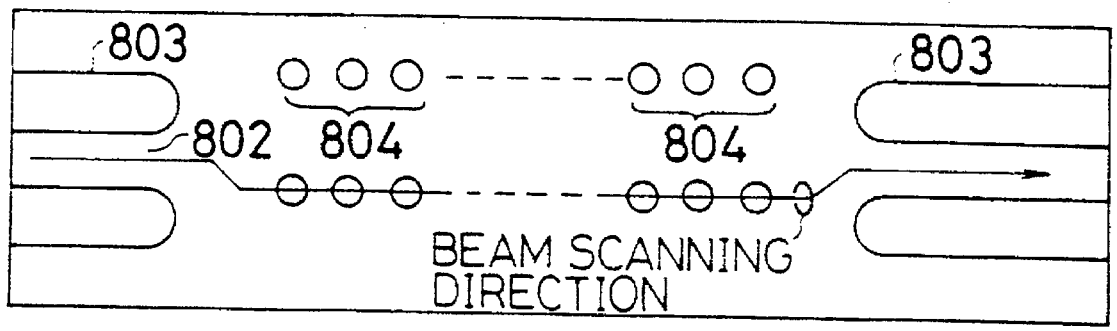
Figure 23A:
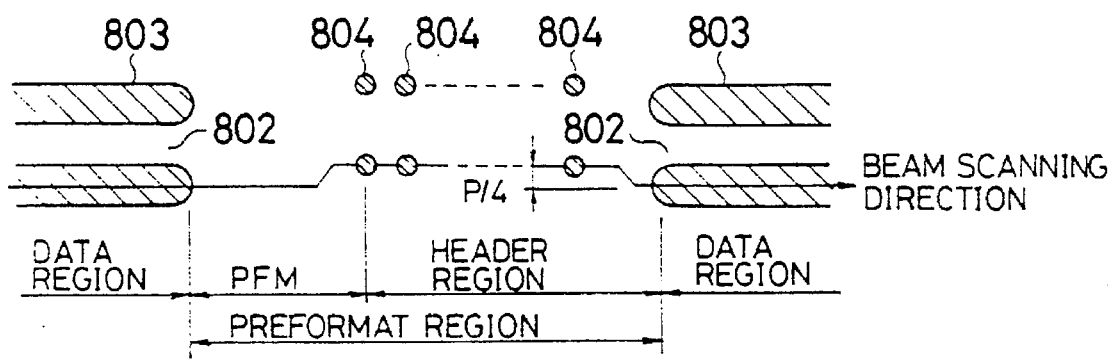
Figure 23B:
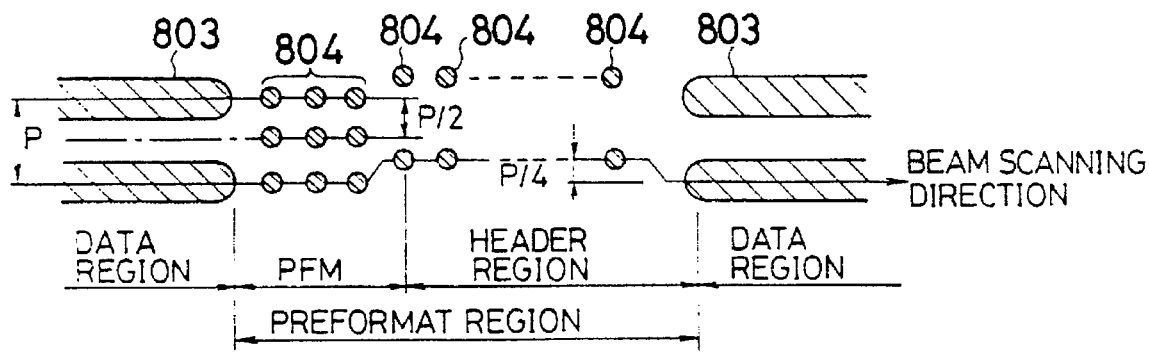
Figure 24:
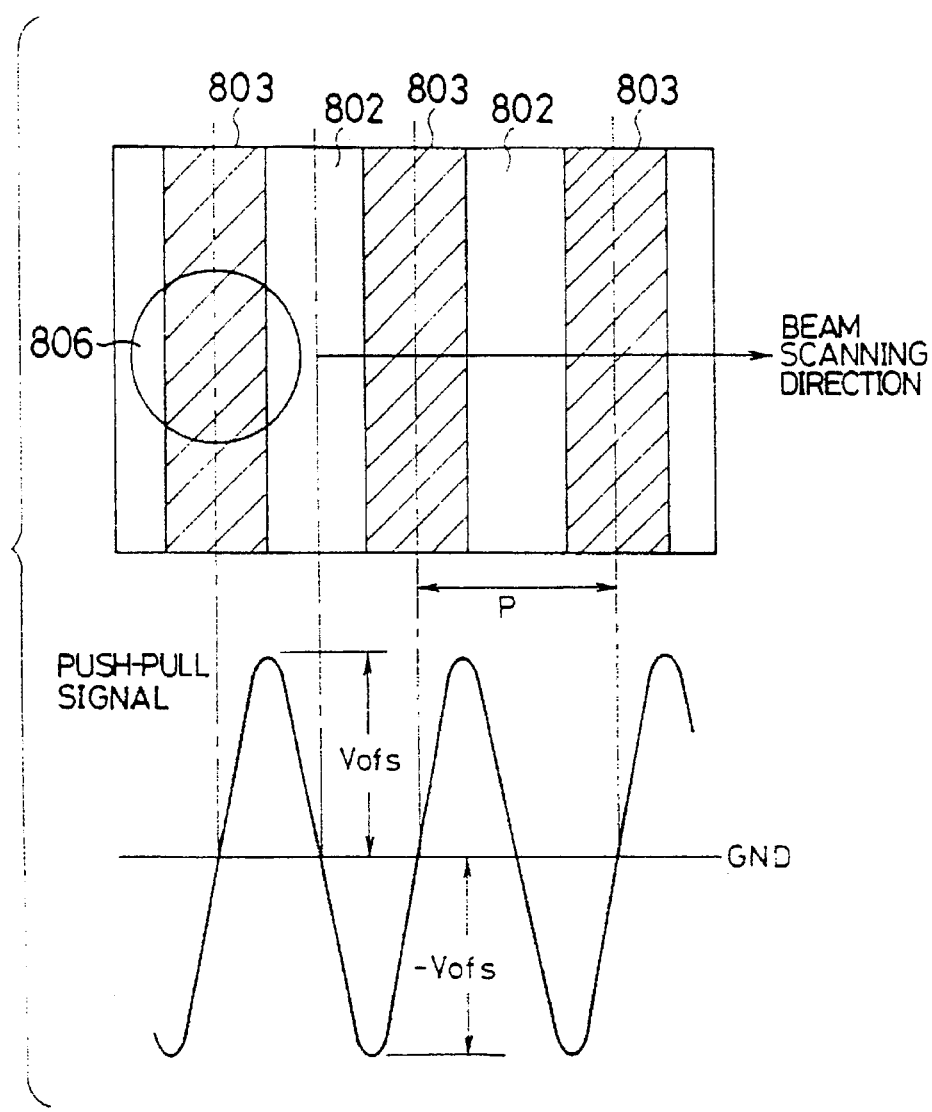
Figure 25:
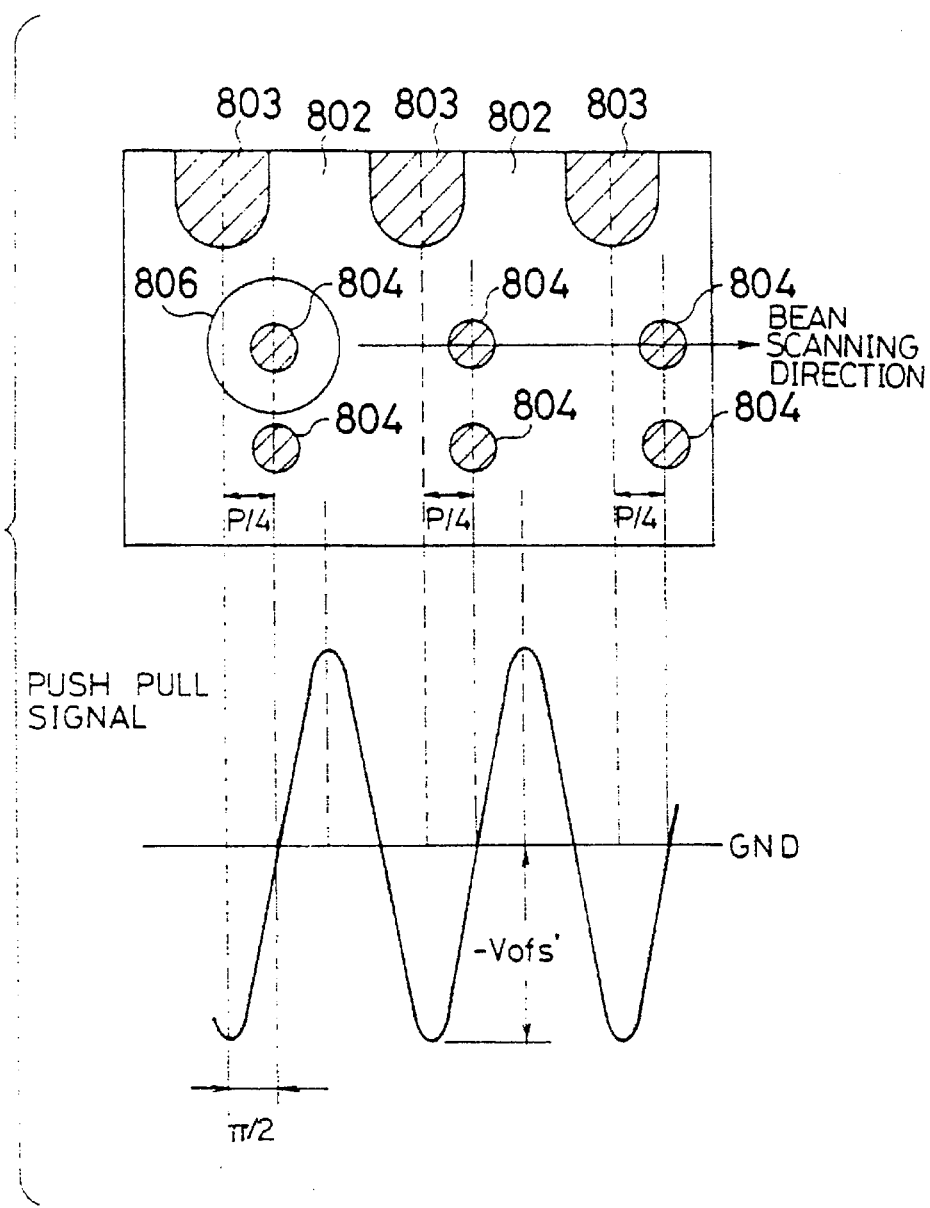
Figure 26:
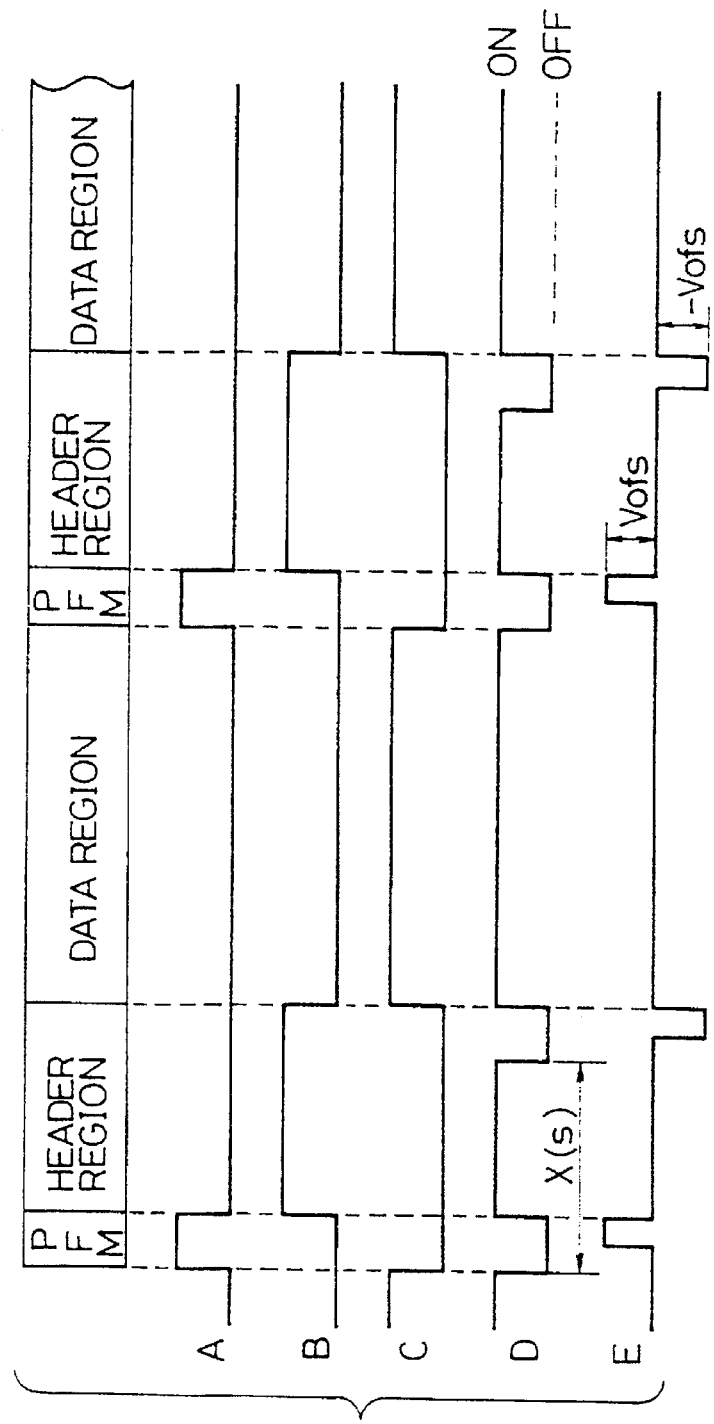
Figure 27:
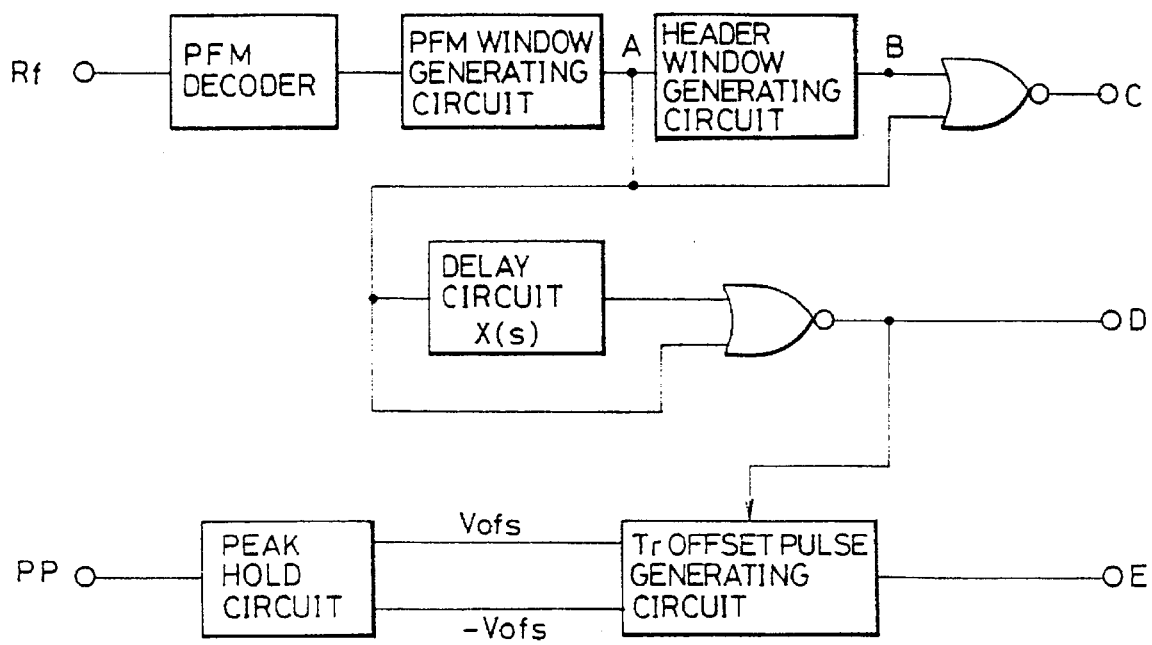
Figure 28:
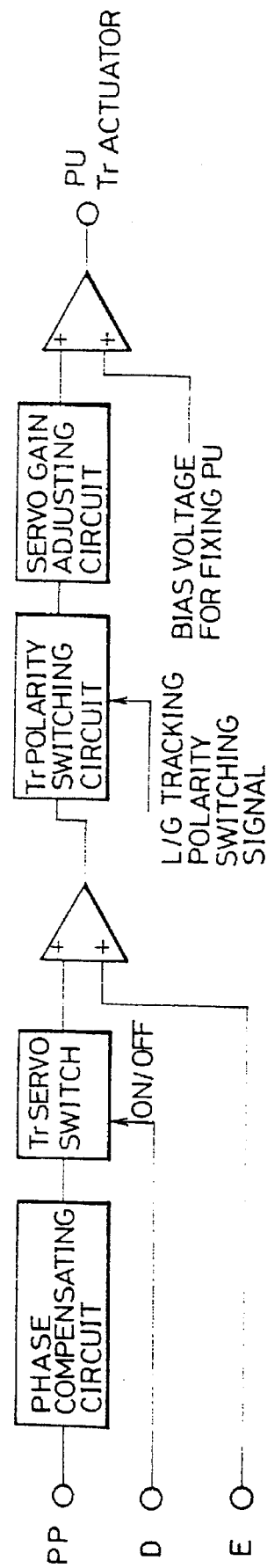
Figure 29:
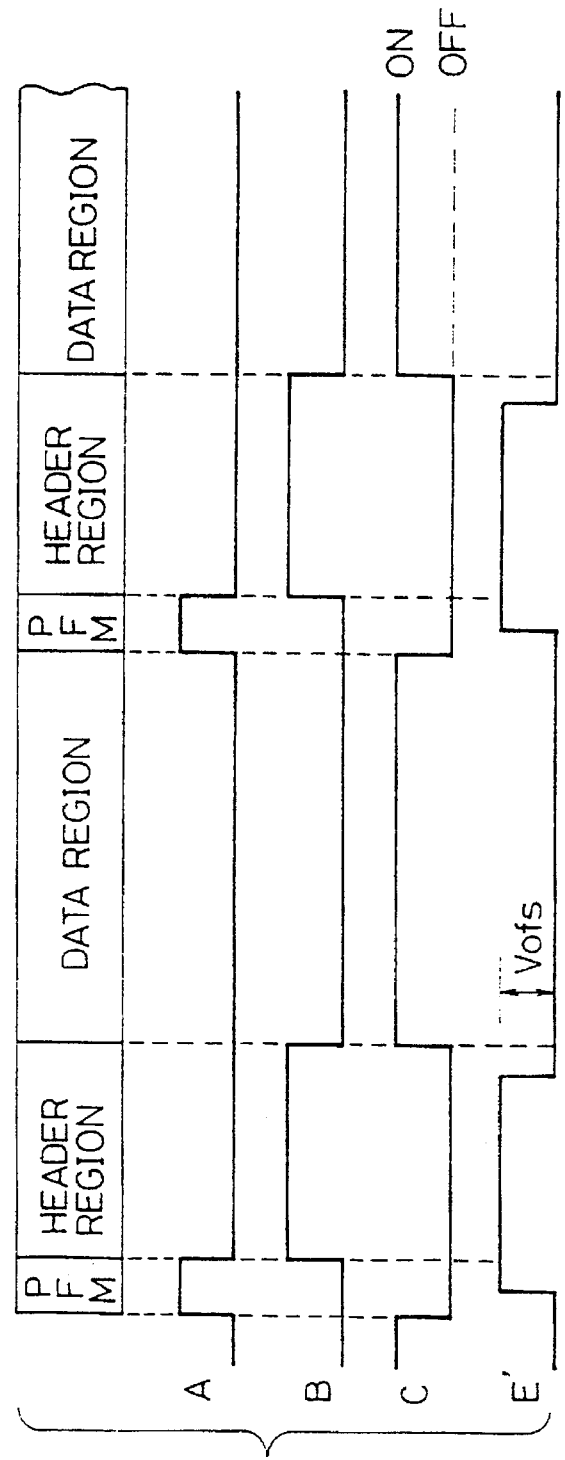
Figure 30:
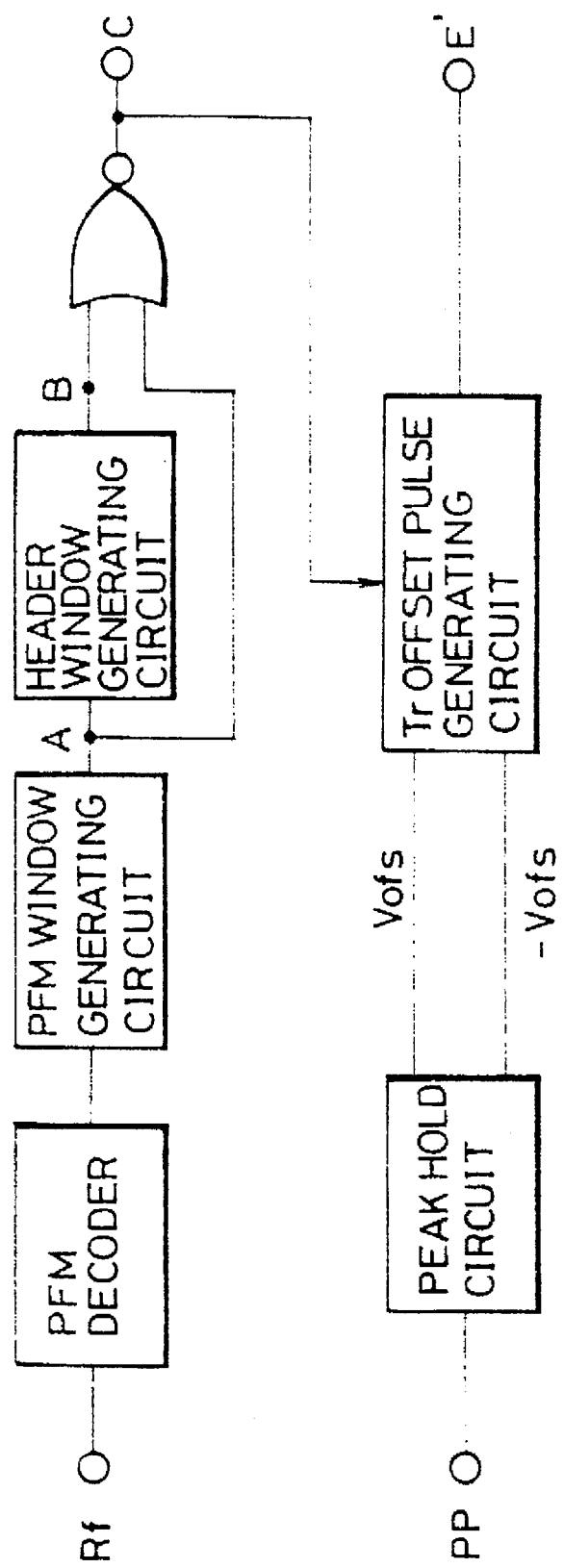
Figure 31:
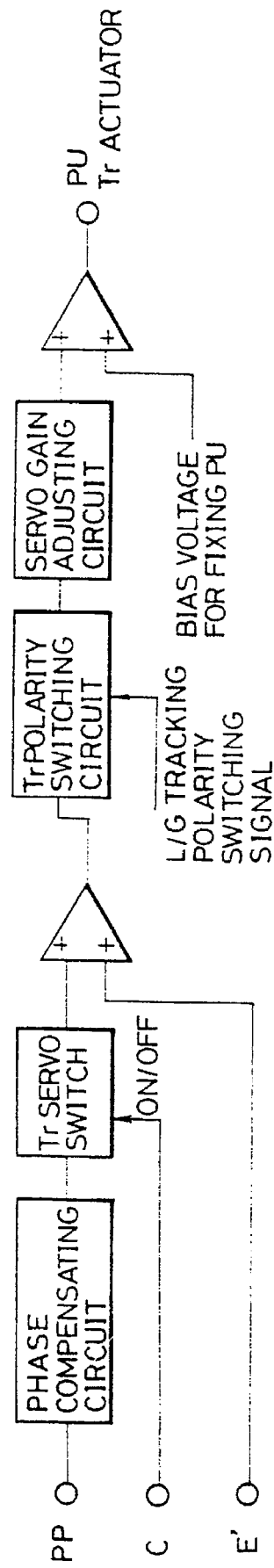
Figure 32A:
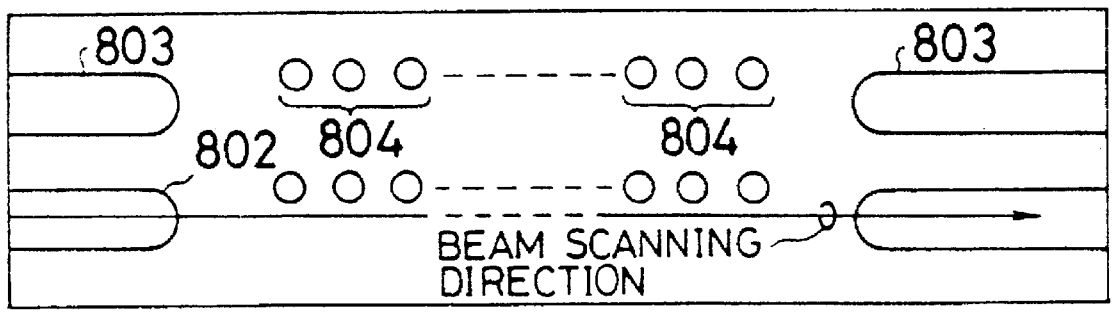
Figure 32B:
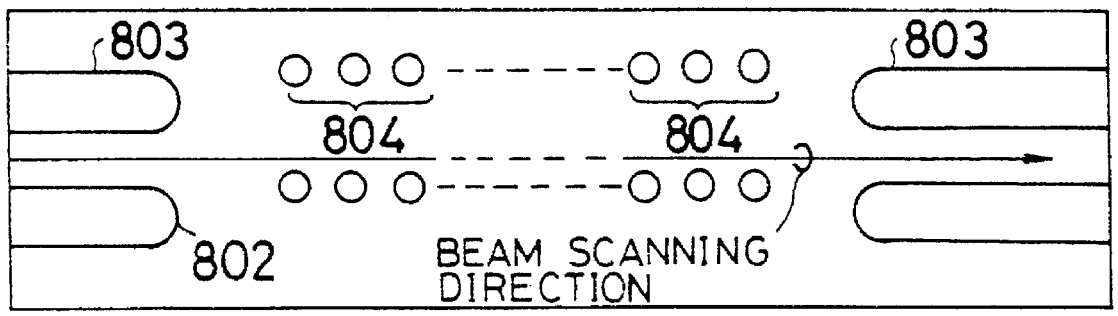
Figure 34:
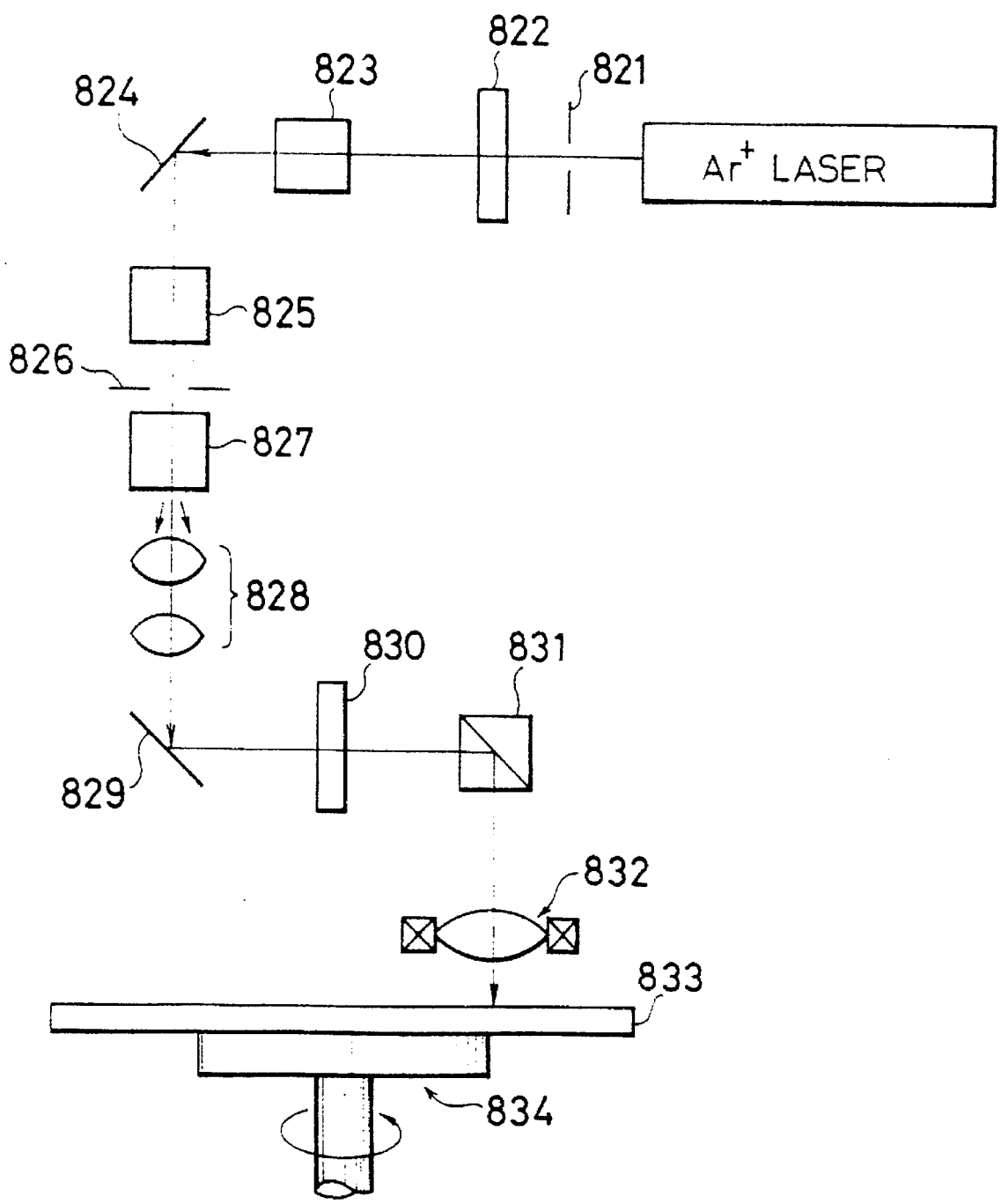
Figure 35:
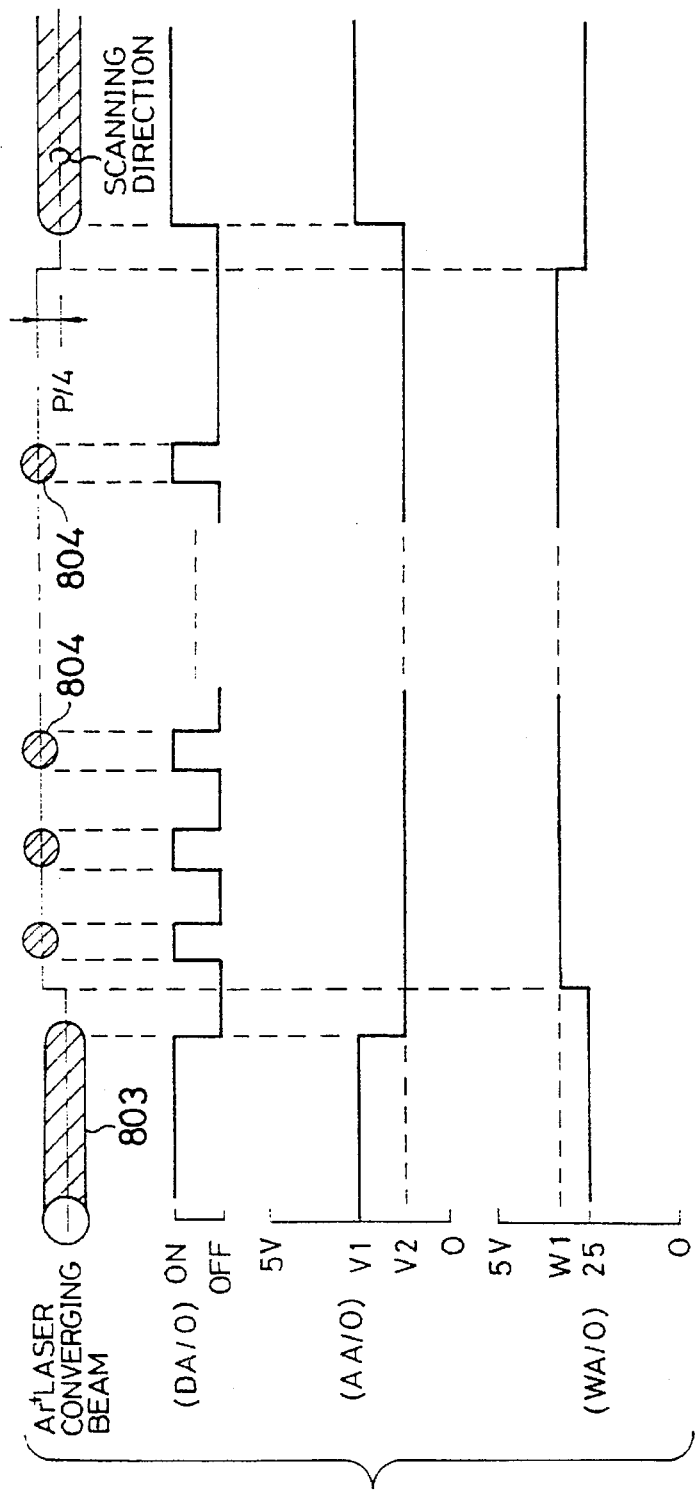
Figure 36:
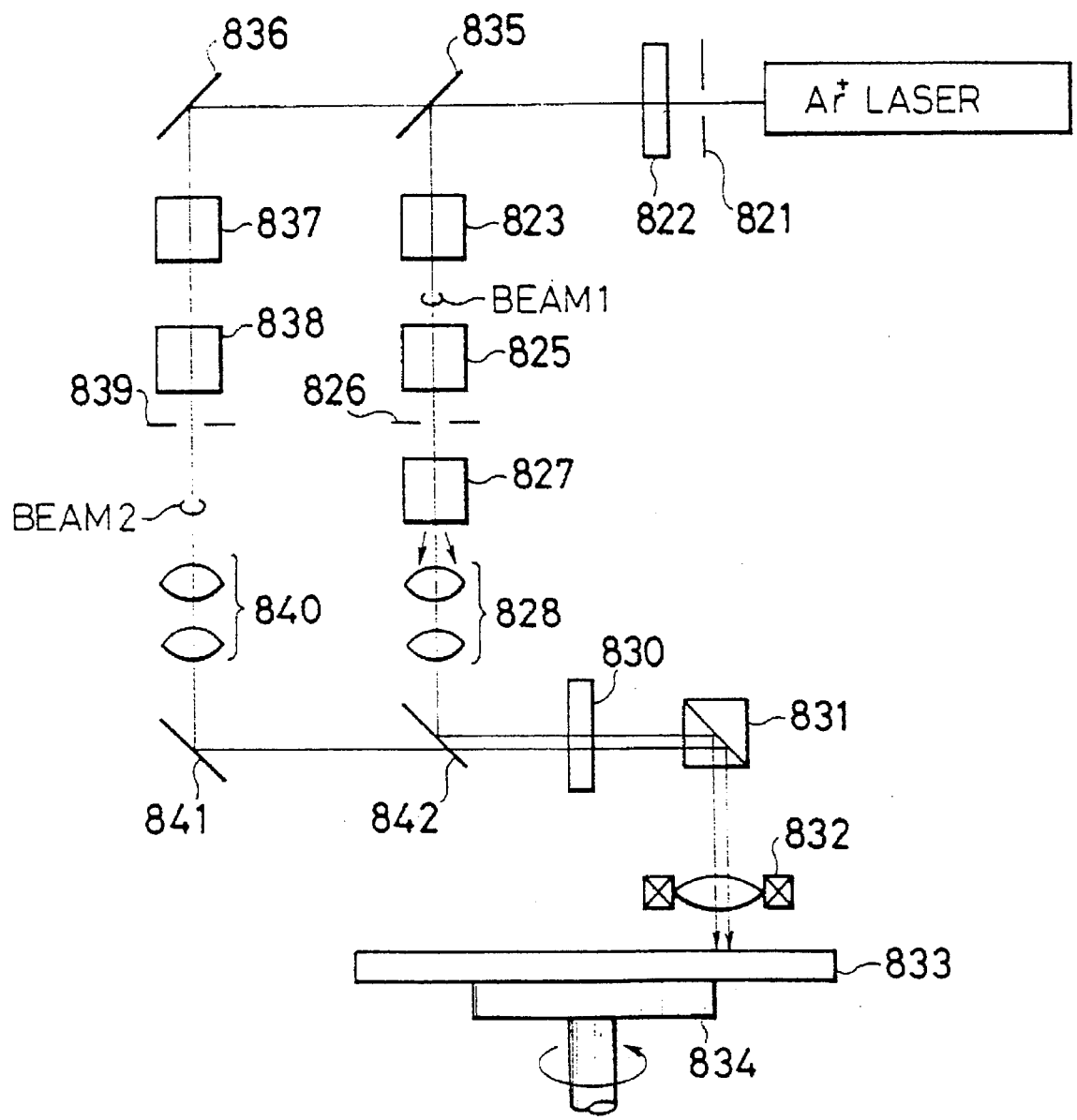
Figure 37:
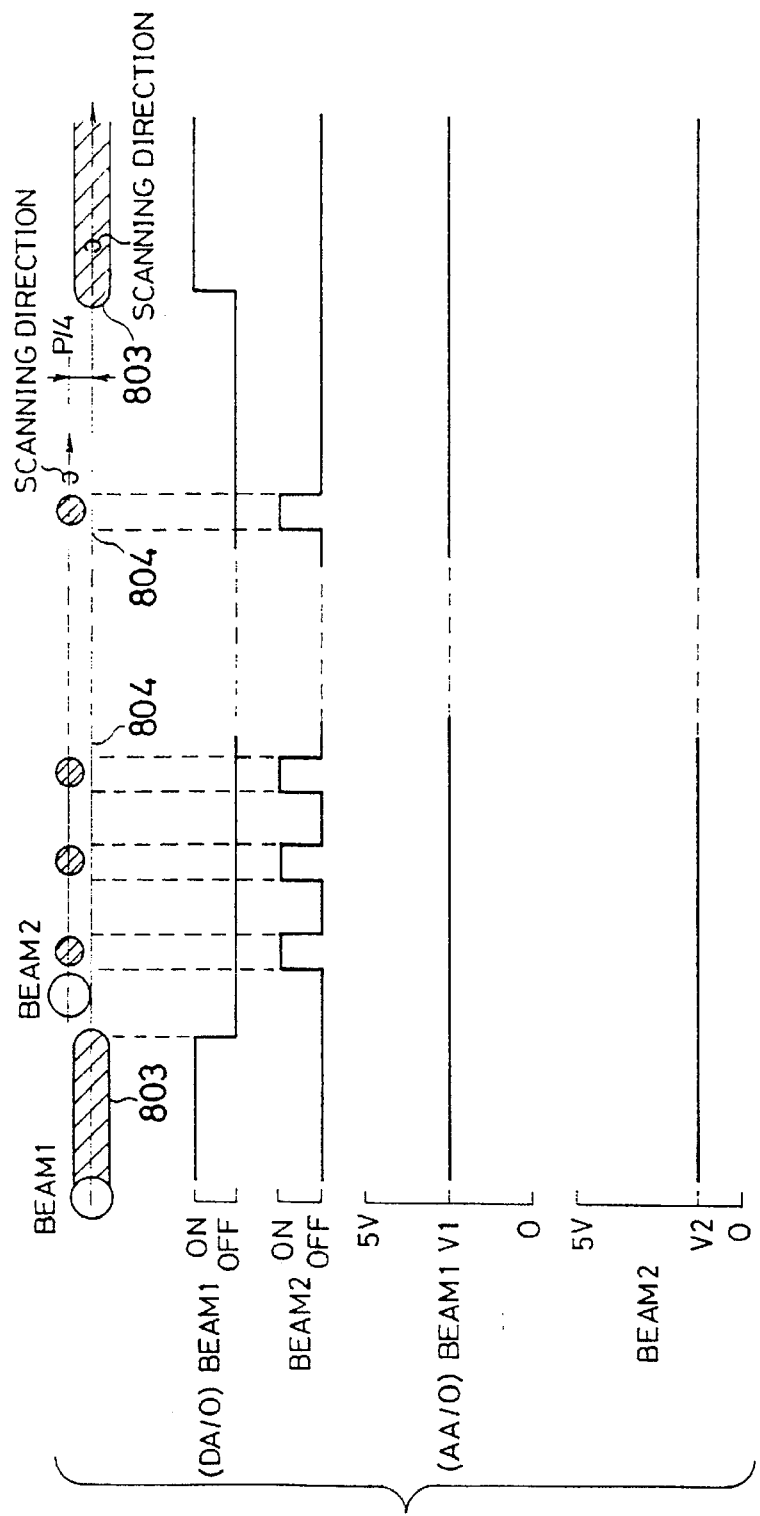
Figure 38:
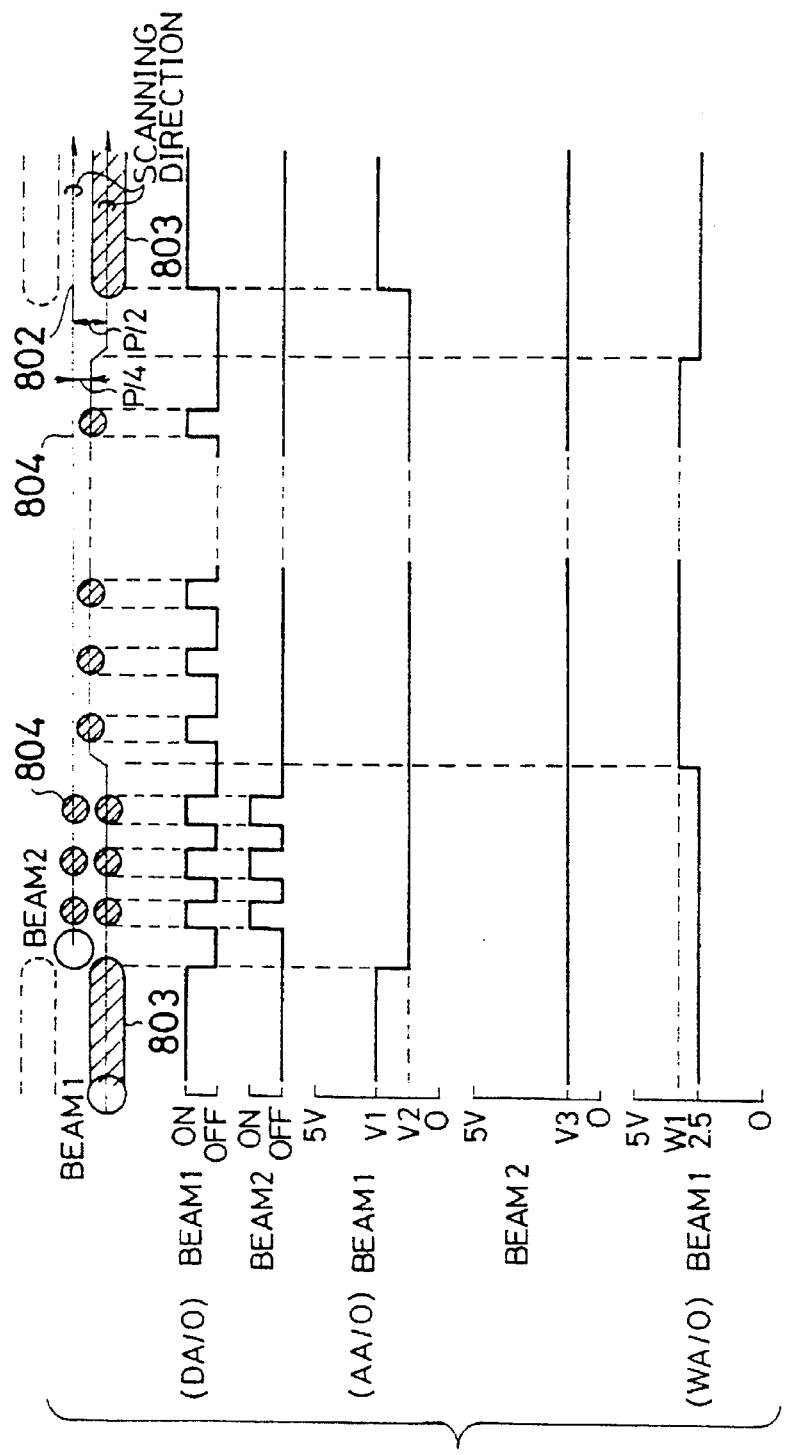
Figure 39:
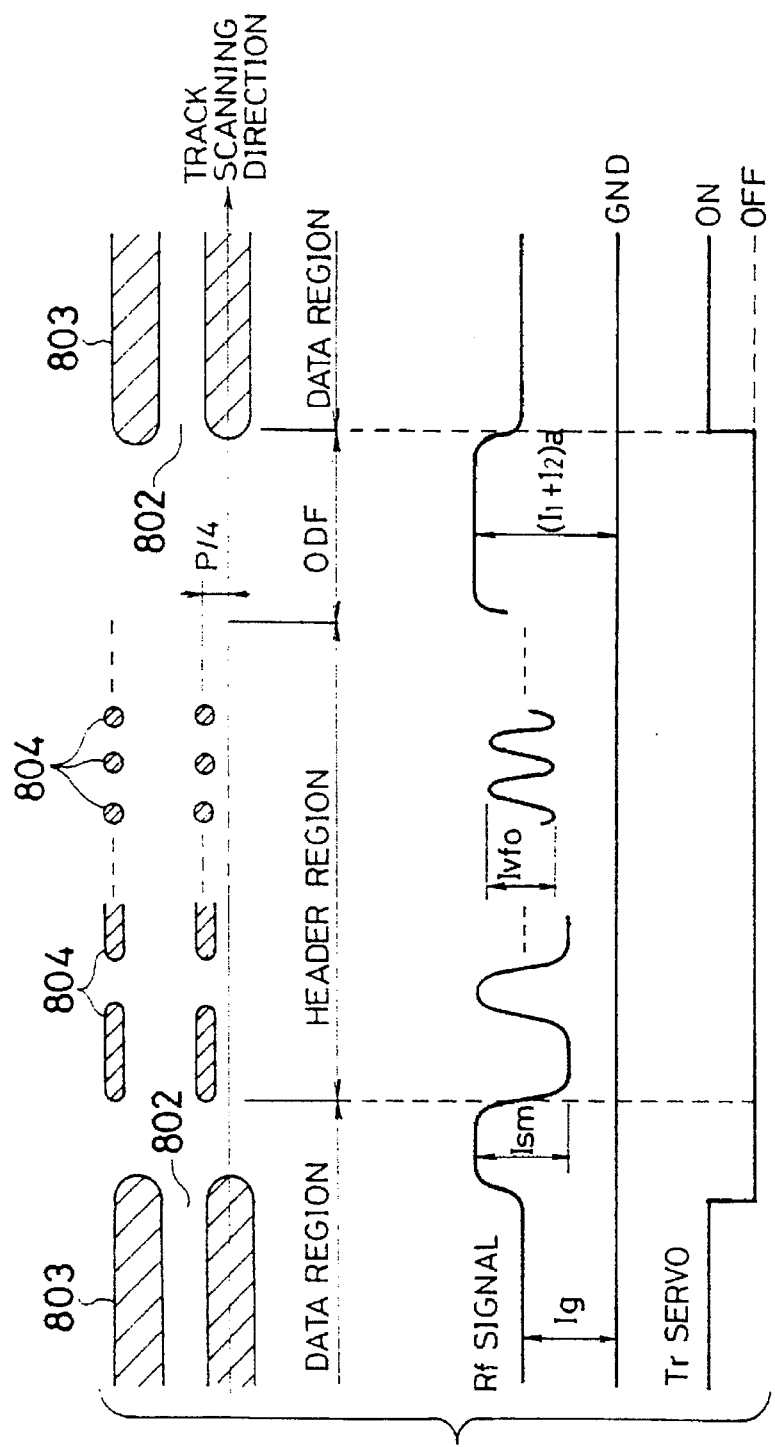
Figure 40:
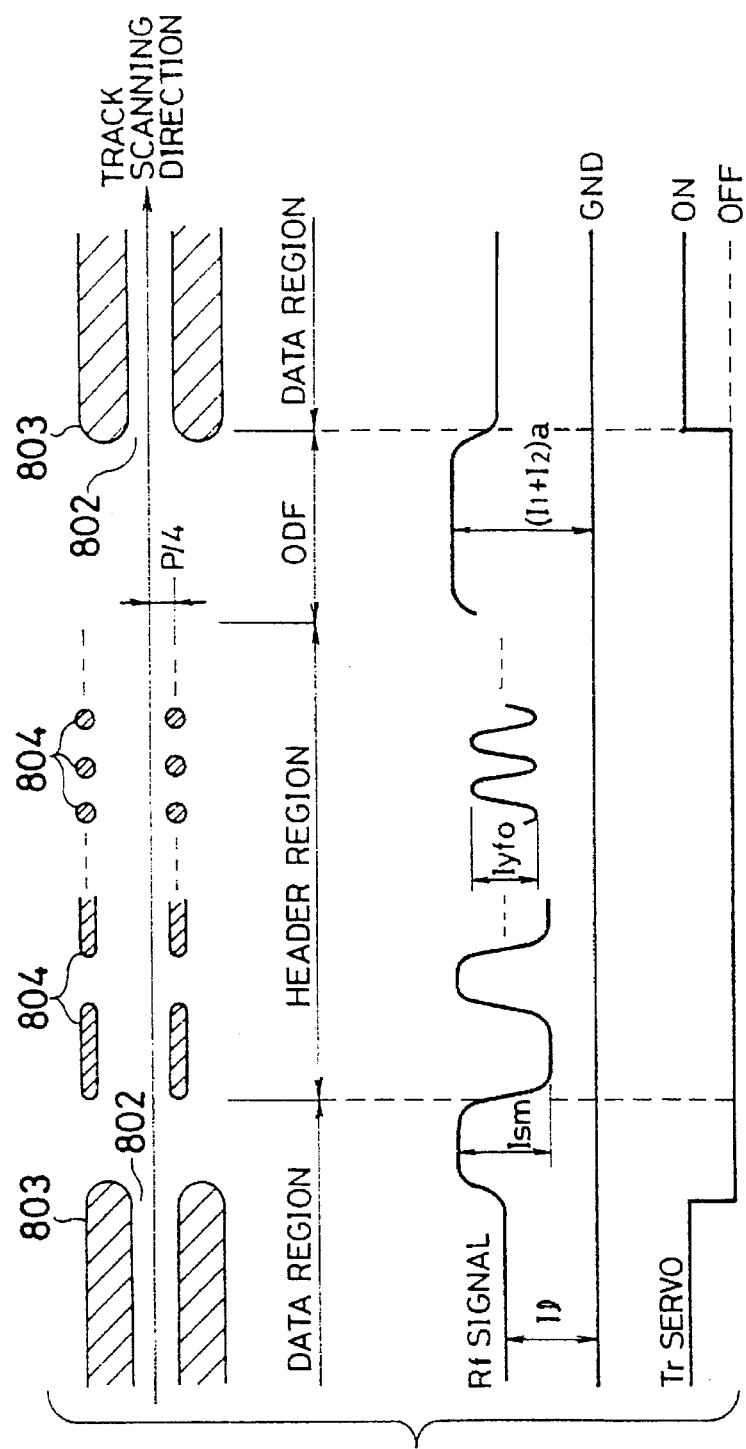
Figure 41:
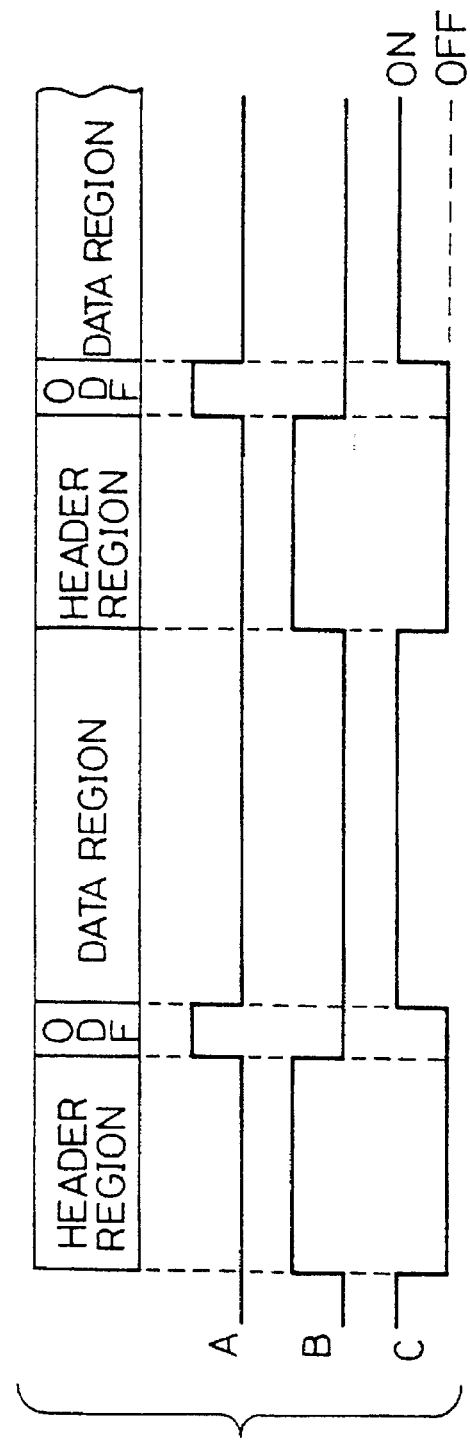
Figure 42:
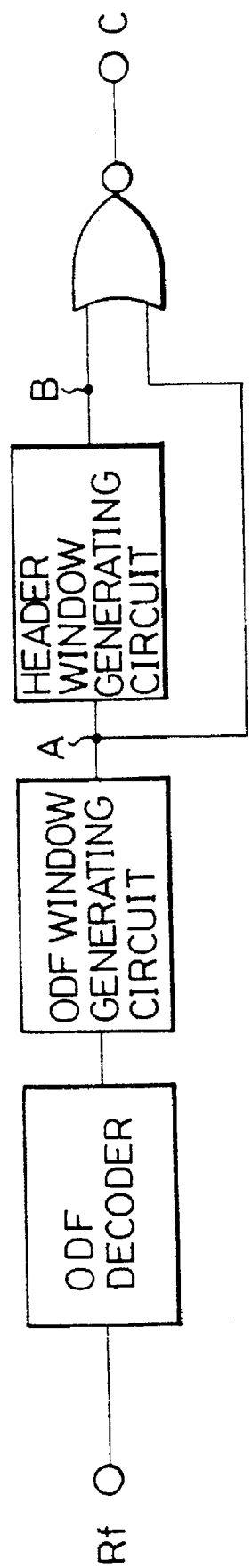
Figure 43:
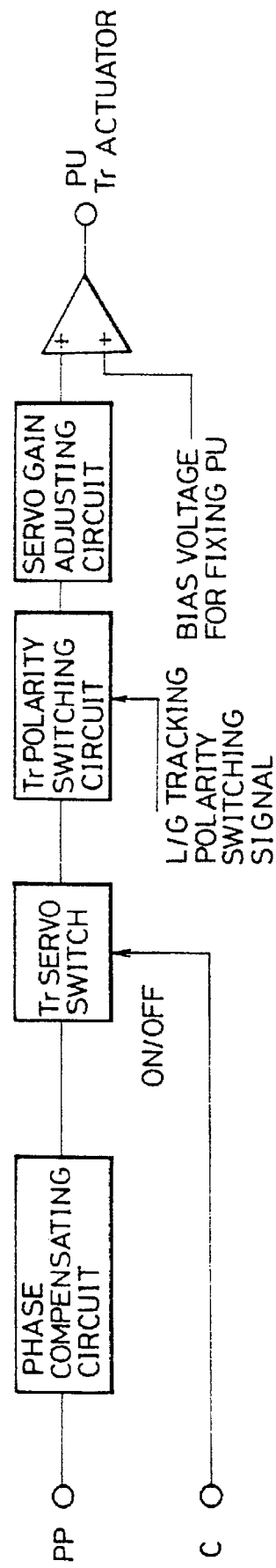

each of FIGS. 10a and 10b is a view for explaining a method for determining a tracking control condition;

FIG. 11 is an explanatory view showing another example of the information recording face of the optical disk;

each of FIGS. 12a and 12b is an explanatory view showing another example of the information recording face of the optical disk;

FIG. 13 is an explanatory view showing the construction of an optical disk unit in accordance with another embodiment of the present invention;

FIG. 14 is an explanatory view showing an optical disk in accordance with another embodiment of the present invention;

FIG. 15 is an explanatory view showing a sector format of a magnetooptic disk having 90 mm in diameter;

FIG. 16 is an explanatory view showing a difference signal (a tracking signal) and a sum signal outputted from a pregroove region;

FIG. 17 is an explanatory view showing a difference signal and a sum signal outputted from a prepit region;

FIG. 18 is a perspective cross-sectional view partially showing the construction of an optical information recording medium in accordance with another embodiment of the present invention;

FIG. 19 is a plan view of the optical information recording medium shown in FIG. 18;

FIGS. 20a to 20d are graphs respectively showing the relation between a groove shape and a groove level, the relation between a groove shape and a land level, the relation between a groove shape and a push-pull signal used for tracking, and the relation between a prepit shape and a prepit signal amplitude;

FIGS. 21a and 21b are views showing the definitions of parameters showing shapes of a prepit and a groove;

each of FIGS. 22a and 22b is a view showing a scanning locus of a laser converging beam at recording and regenerating times;

each of FIGS. 23a and 23b is a view for explaining the construction of a preformat;

FIG. 24 is a view for explaining a preformat region constructed by a groove and a land and the waveform of a push-pull signal in this preformat region;

FIG. 25 is a view for explaining a preformat region constructed by a prepit series and the waveform of a push-pull signal in this preformat region;

FIG. 26 is a timing chart of signals used for switching tracking operations;

FIG. 27 is a block diagram of electric circuits for generating respective signals used for switching the tracking operations;

FIG. 28 is a block diagram showing a tracking servo circuit used in the present invention;

FIG. 29 is a timing chart of signals provided when a tracking servo ON/OFF switching operation is performed by using a preformat window signal C;

FIG. 30 is a block diagram of an electric circuit for generating a track offset signal E' at preferable timing;

FIG. 31 is a block diagram of the tracking servo circuit shown in FIG. 28 when the preformat window signal C shown in FIG. 29 is used as a tracking servo signal and the track offset signal E' shown in FIG. 29 is used as a track offset signal;

FIGS. 32a and 32b are views for explaining regeneration of preformat information;

FIGS. 33a to 33g are views for explaining a method for manufacturing a polycarbonate substrate by injection molding;

FIG. 34 is a block diagram showing an optical system of an original board exposure apparatus;

FIG. 35 is a timing chart for controlling an argon $Ar^+$ laser converging beam;

FIG. 36 is a block diagram showing an optical system of an original board exposure apparatus using two argon Ar+ laser converging beams;

FIG. 37 is an operational timing chart of signals provided when the original board exposure apparatus shown in FIG. 36 is used;

FIG. 38 is another operational timing chart of signals provided when the original board exposure apparatus shown in FIG. 36 is used;

FIG. 39 is a view for explaining a scanning locus of a laser converging beam in a header region in another embodiment of the present invention;

FIG. 40 is a view for explaining a scanning locus of the laser converging beam scanned on a land in another embodiment of the present invention;

FIG. 41 is a view for explaining the tracking servo ON/OFF switching operation in another embodiment of the present invention;

FIG. 42 is a block diagram of an electric circuit for obtaining a tracking servo ON/OFF switching signal C; and FIG. 43 is a block diagram of a tracking servo circuit.

DESCRIPTION OF THE PREFERRED EMBODIMENTS

The preferred embodiments of an optical disk unit, a control method thereof, an optical information recording medium and a recording-regenerating method using this optical information recording medium in the present invention will next be described in detail with reference to the accompanying drawings.

Figure 1:
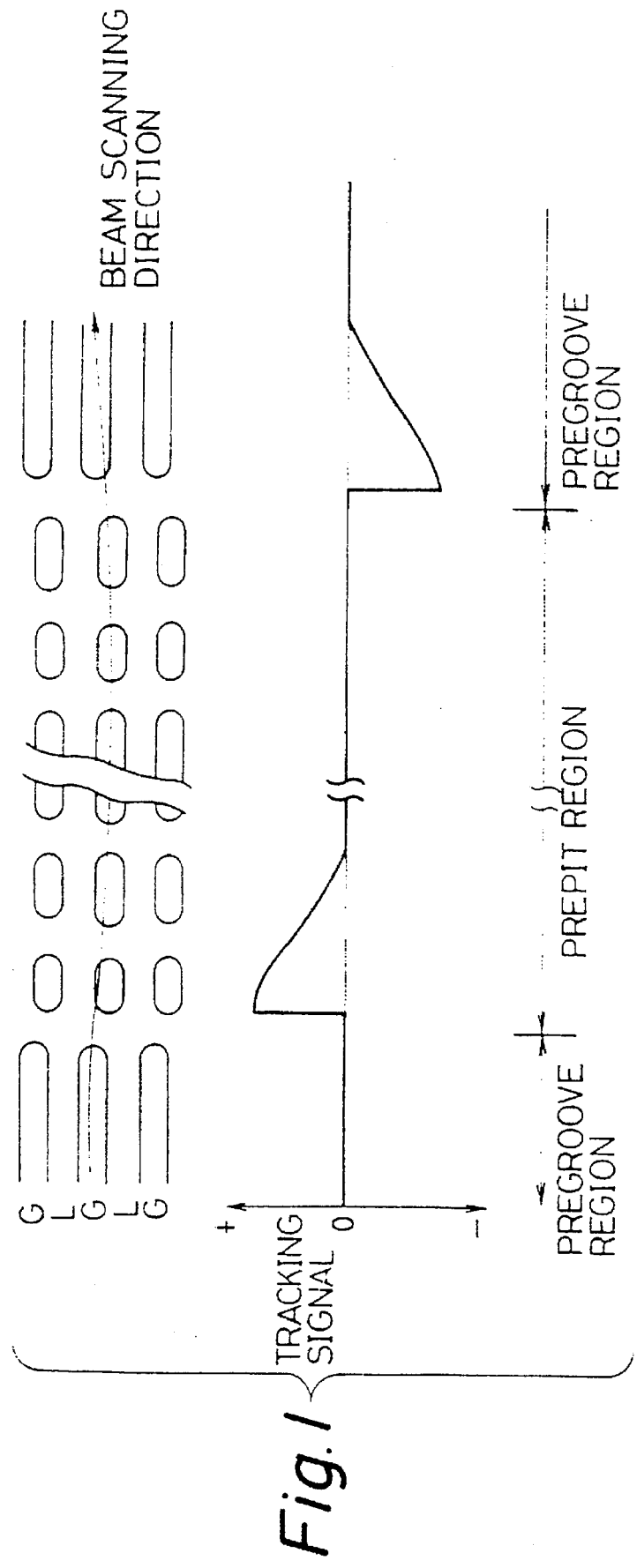
FIG. 1 is an explanatory view showing the relation between a beam locus and a tracking signal when an optical pickup tracks a pregroove.
Figure 2:
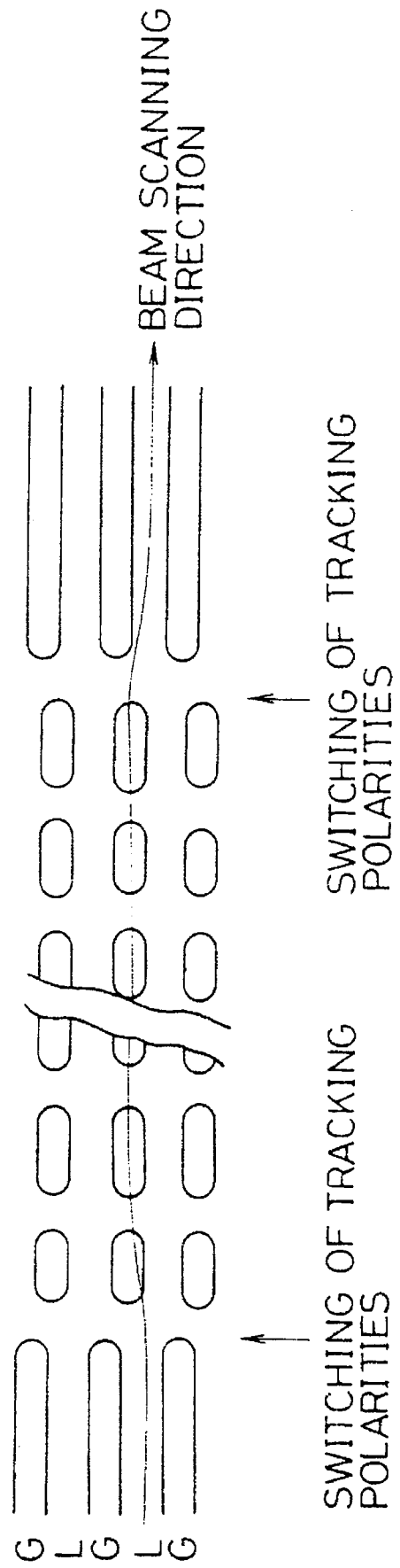
FIG. 2 is an explanatory view showing the relation between a beam locus and switching timing of tracking polarities when the optical pickup tracks a land.
Figure 3:
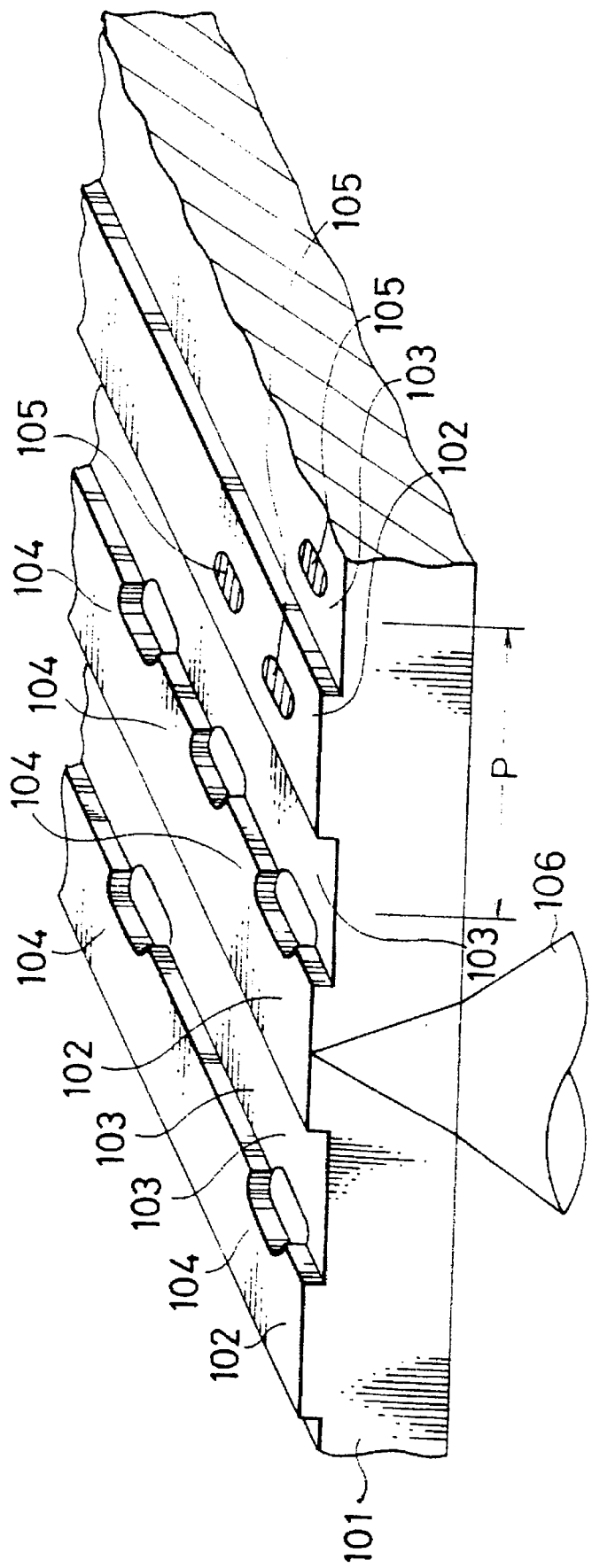
FIG. 3 is a perspective cross-sectional view partially showing the construction of an optical information recording medium previously proposed by inventors of this application.
Figure 4:
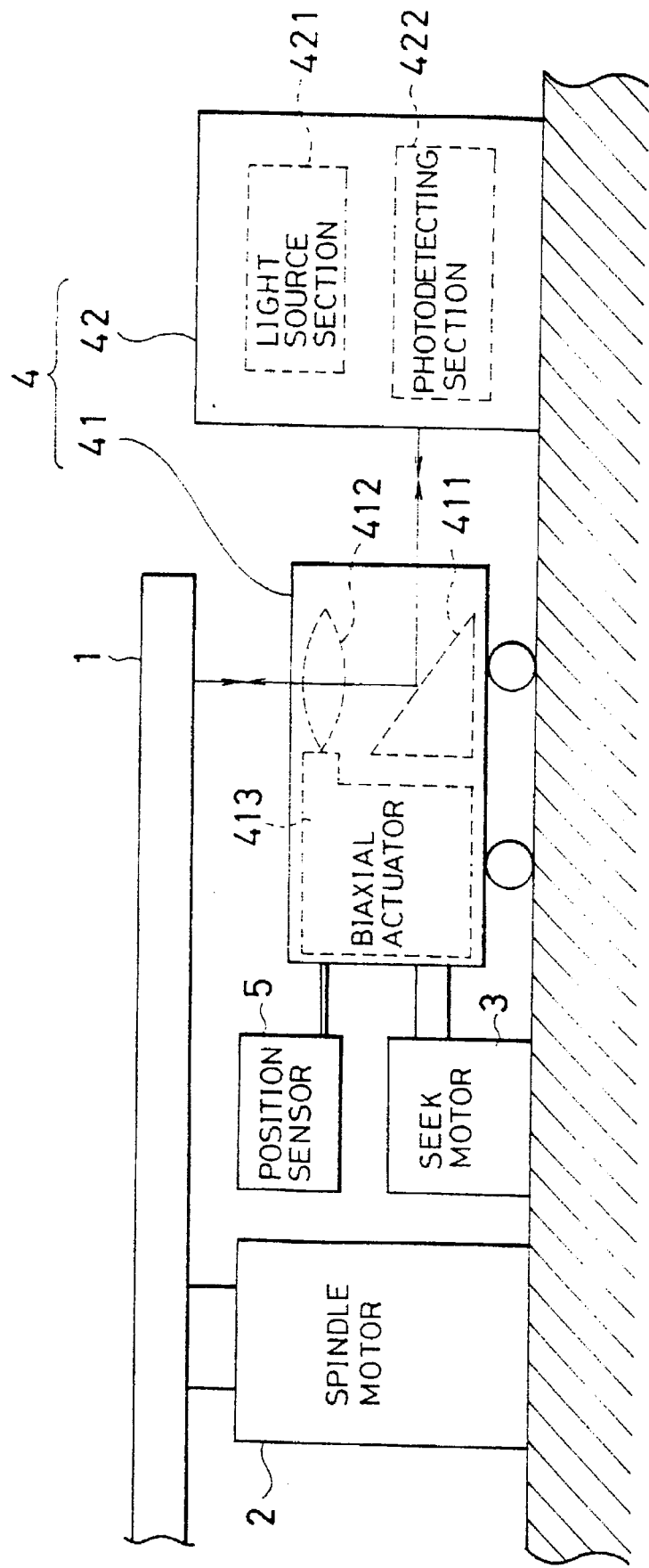
FIG. 4 is a view showing the schematic construction of an optical disk unit in accordance with one embodiment of the present invention.

FIG. 4 is a view showing the schematic construction of an optical disk unit in accordance with one embodiment of the present invention. In FIG. 4, for example, an optical disk 1 is constructed by a write-once type recording medium in a hole boring recording system. The optical disk 1 is fixed to a rotating shaft of a spindle motor 2 and is rotated by this spindle motor 2. A seek motor 3, a moving optical system 41 and a position sensor 5 are arranged on a lower right-hand side of the optical disk 1. The moving optical system 41 is moved by the seek motor 3 in a radial direction of the optical disk 1. The position sensor 5 detects a position of the moving optical system 41. A fixed optical system 42 is arranged on a side of the moving optical system 41. The moving optical system 41 and the fixed optical system 42 constitute an optical pickup 4.

A light source section 421 and a photodetecting section 422 are arranged within the fixed optical system 42. The light source section 421 emits a laser beam and the photodetecting section 422 detects light reflected on the optical disk 1. A mirror 411, an objective lens 412 and a biaxial actuator 413 are arranged within the moving optical system 41. The mirror 411 forms an optical path between the optical disk 1 and the fixed optical system 42. The objective lens 412 converges a laser beam irradiated onto the optical disk 1. The biaxial actuator 413 moves the objective lens 412 in a radial direction of the optical disk 1 and a direction perpendicular to a disk face.

Figure 5:
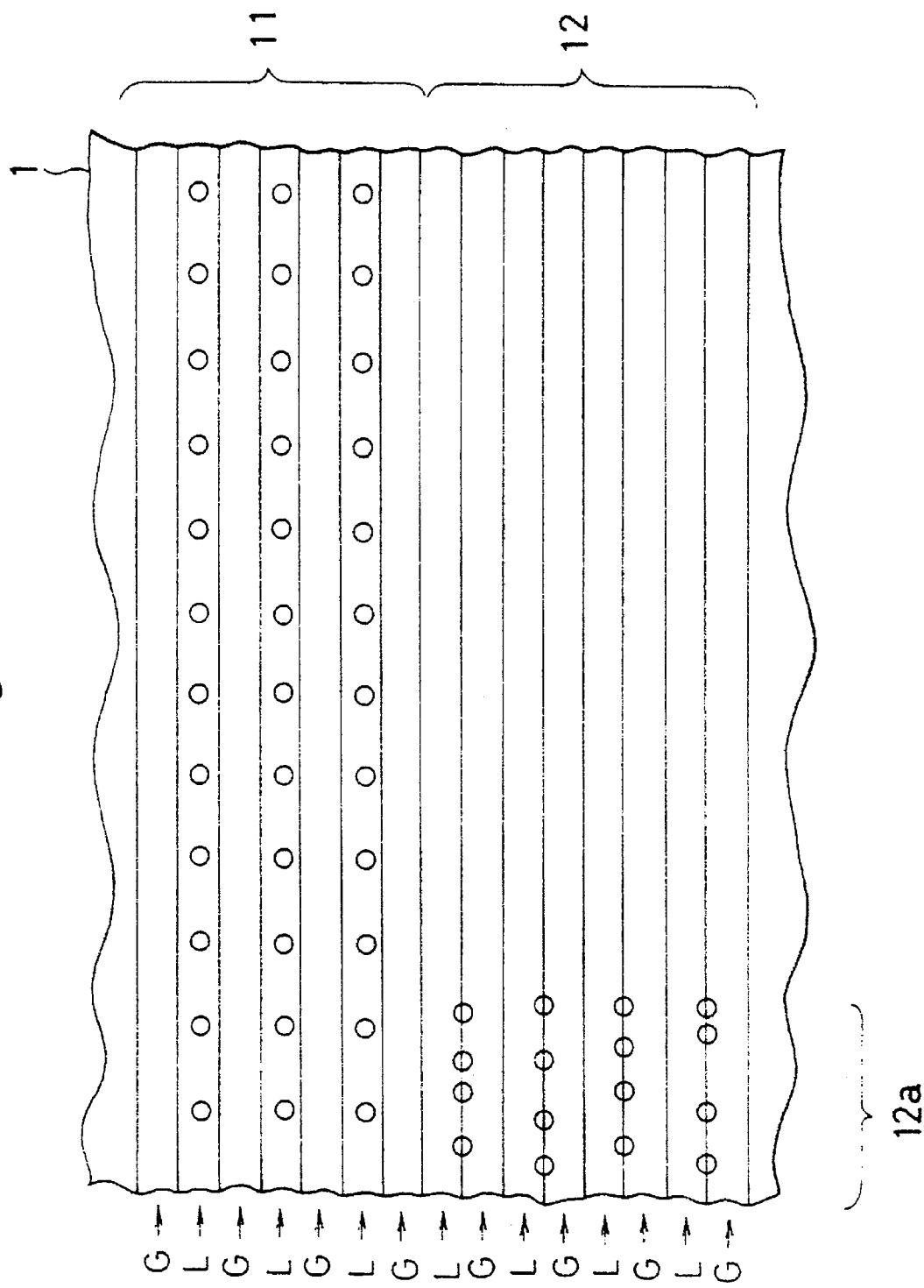
FIG. 5 is a view for explaining an information recording face of an optical disk.

As shown in FIG. 5, for example, a groove portion G and a land portion L are formed in the optical disk 1 in this embodiment such that each of the groove and land portions has the same width such as about 0.8 µm. A step difference between the groove portion G and the land portion L is set to about ⅛ times a wavelength λ of the irradiated light beam. One portion of a track region is set to a land/groove discriminating region 11. The remaining portion of the track region is set to a recording region 12 for user information.

A prepit is formed along an entire circumference of the optical disk in the land portion L of the land/groove discriminating region 11. This prepit is used to discriminate the land portion L and the groove portion G from each other. Several ten information sectors per one round of a track are formed in the recording region 12. A prepit indicative of address information is formed in a header portion 12a of each of the information sectors. This address information is known information showing a track number and a sector number.

Figure 6:
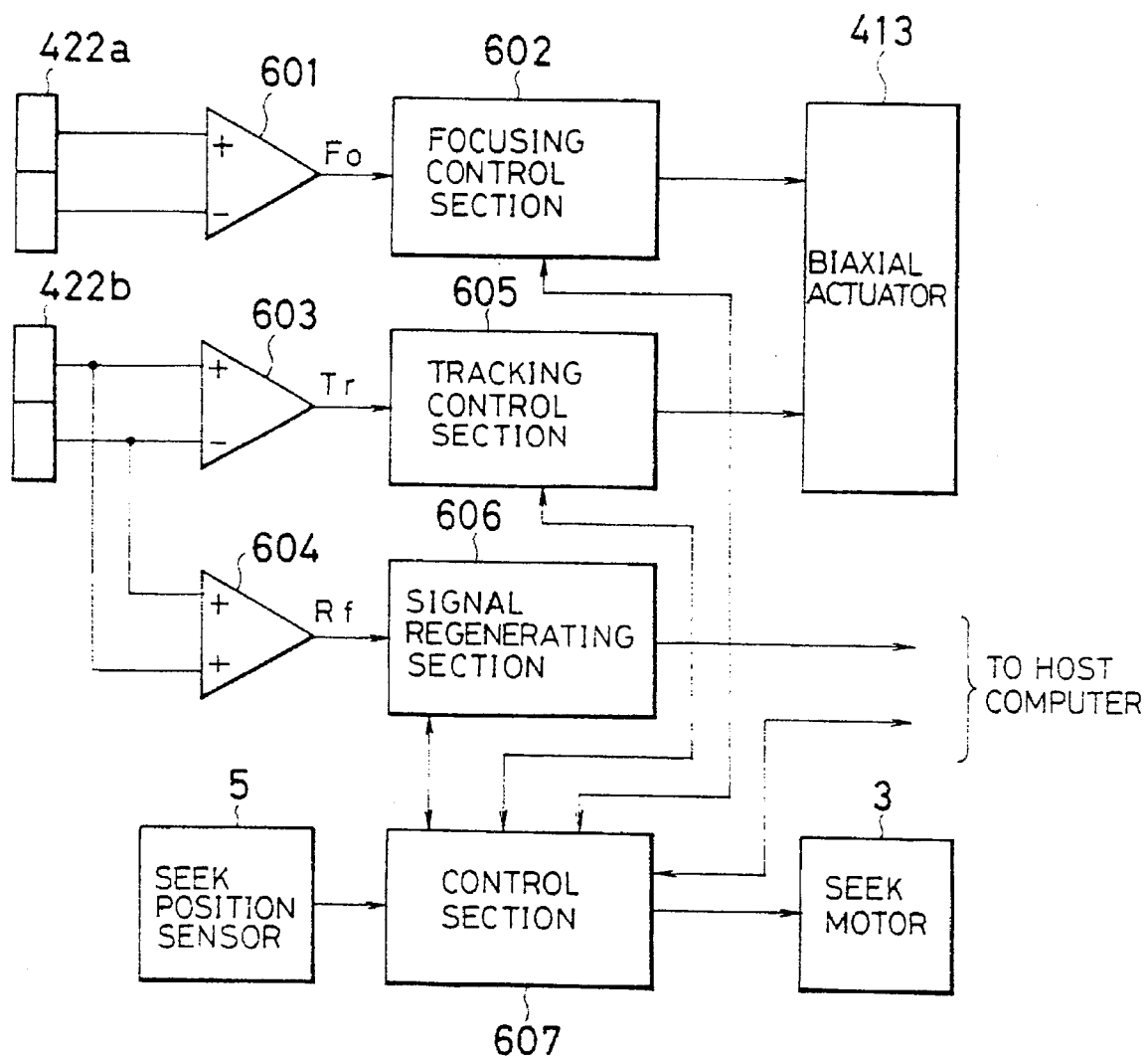
FIG. 6 is a block diagram showing the construction of a control circuit.

FIG. 6 shows a signal circuit of the above optical disk unit. In FIG. 6, each of two-divisional light receiving elements 422a and 422b is arranged within the photodetecting section 422. The two-divisional light receiving element 422a detects a focusing error by a known knife edge method. The two-divisional light receiving element 422b detects a tracking error by a known push-pull method.

Two detecting signals of the two-divisional light receiving element 422a are inputted to a subtracting circuit 601. An output of this subtracting circuit 601 is inputted to a focusing control section 602. The focusing control section 602 executes focusing control of the laser beam irradiated onto the optical disk 1. The focusing control section 602 controls an operation of the biaxial actuator 413 in one actuating direction.

Two detecting signals of the two-divisional light receiving element 422b are inputted to a subtracting circuit 603 and an adding circuit 604. An output of the subtracting circuit 603 is inputted to a tracking control section 605. The tracking control section 605 executes tracking control of the laser beam irradiated onto the optical disk 1. The tracking control section 605 controls the operation of the biaxial actuator 413 in another actuating direction.

An output of the adding circuit 604 is inputted to a signal regenerating section 606. The signal regenerating section 606 regenerates recorded information of the optical disk 1. A control section 607 monitors and controls operations of such constructional sections. The control section 607 receives various kinds of commands from an unillustrated host computer. The control section 607 then executes a control operation for recording and regenerating information with respect to the optical disk 1 in accordance with these commands.

In the above construction, when a power source of the optical disk unit in this embodiment is turned on, an operation of the optical disk unit is started.

Figure 7:
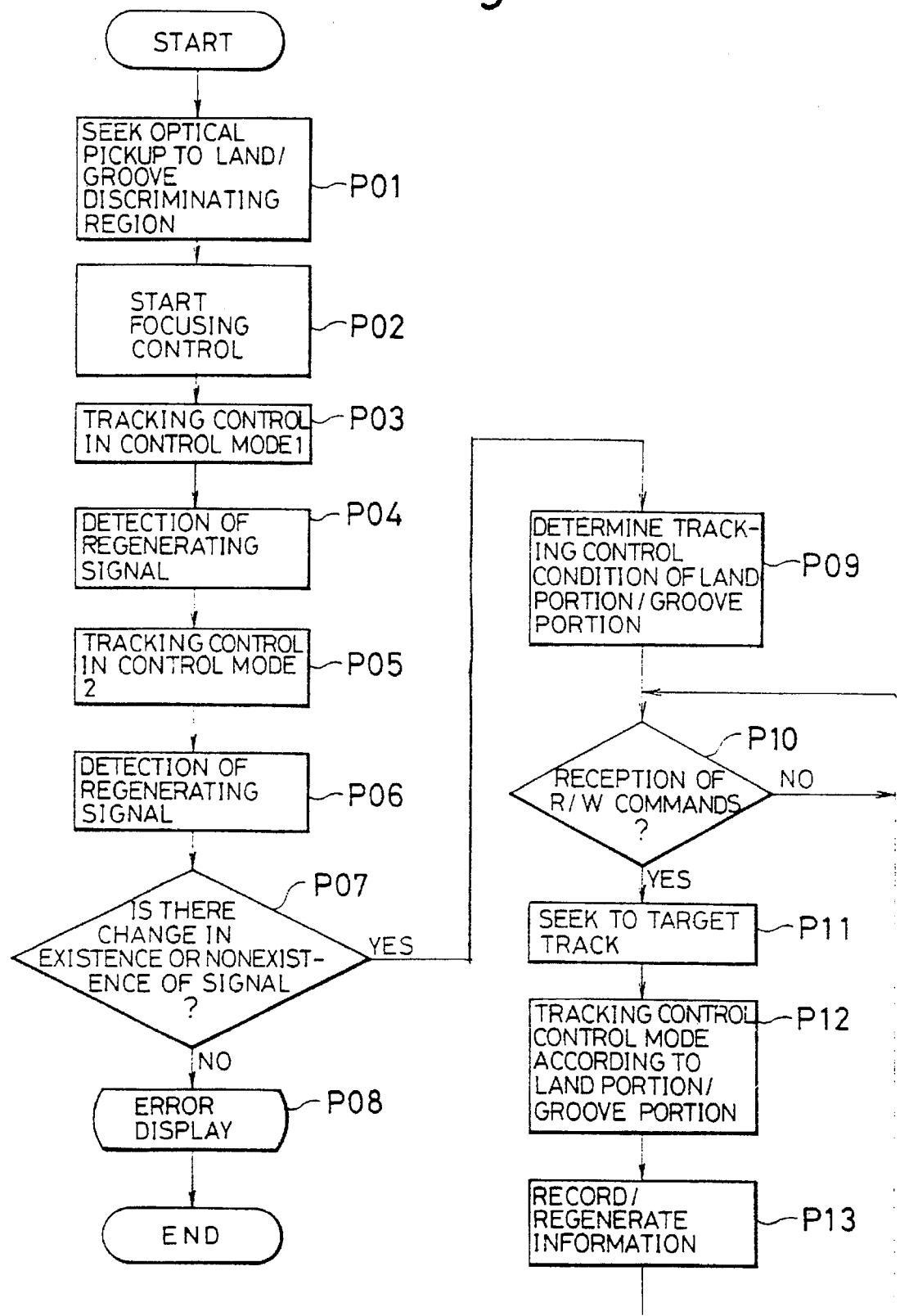
FIG. 7 is a flow chart showing an operation of the above optical disk unit.

In this case, as shown in a processing step P01 in FIG. 7, the optical pickup 4 in the optical disk unit seeks a prescribed position within the land/groove discriminating region 11 of the optical disk 1. This seeking operation of the optical pickup 4 is an operation for moving the moving optical system 41 by the seek motor 3. At this time point, it is not clear whether a seeking position of the optical pickup 4 is located in a land portion L or a groove portion G.

Focusing control of the optical disk unit is next started. Namely, a laser beam is emitted from the fixed optical system 42 and is converged by the moving optical system 41, The converged light beam is then irradiated onto the optical disk 1 as spot light. Light reflected on the optical disk 1 is returned to the fixed optical system 42 through a reverse path and is detected by the photodetecting section 422. In this case, a difference between two detecting signals of the two-divisional light receiving element 422a is caused in accordance with a focusing shift of the laser spot irradiated onto the optical disk 1. This operation is known in a knife edge method. The subtracting circuit 601 outputs this difference as a focusing error signal Fo. The focusing control section 602 drives the biaxial actuator 413 such that this focusing error signal Fo is minimized. Thus, in a processing step P02, a focal point of the laser beam irradiated onto the optical disk 1 is adjusted.

Tracking control of the optical disk unit is next started.

The laser spot is now irradiated onto any one of the land portion L and the groove portion G. In any case, a difference between two detecting signals of the two-divisional light receiving element 422b is caused in accordance with a shift in irradiating position of the laser spot with respect to a central position of each of the land and groove portions. This operation is known in a push-pull method. The subtracting circuit 603 outputs this difference between the two detecting signals as a tracking error signal Tr.

Figure 8:
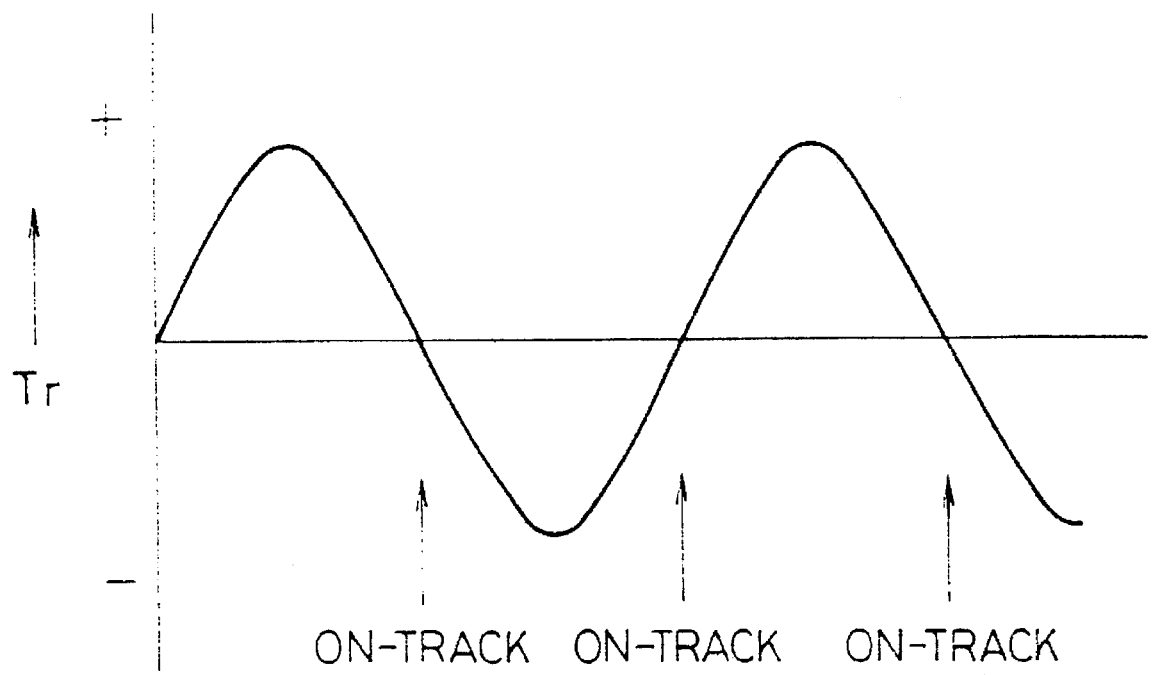
FIG. 8 is a view for explaining a tracking error signal.

Accordingly, as shown in FIG. 8, this tracking error signal Tr shows a level "0" in a on-track state in which there is no position shift of the laser spot from the land portion L or the groove portion G. The tracking error signal Tr shows a level "+" when the laser spot is shifted on one side from the land portion L or the groove portion G. The tracking error signal Tr shows a level "−" when the laser spot is shifted on the other side from the land portion L or the groove portion G.

The tracking control is an operation for moving the irradiating position of the laser spot such that this tracking error signal Tr is minimized. In this embodiment, as shown in FIG. 9, the optical disk unit has two control modes composed of control modes 1 and 2. In the control mode 1, the irradiating position of the laser spot is moved onto an outer circumferential side of the optical disk 1 when the tracking error signal Tr shows the level "+". The irradiating position of the laser spot is moved onto an inner circumferential side of the optical disk 1 when the tracking error signal Tr shows the level "−". In contrast to this, in the control mode 2, the irradiating position of the laser spot is moved onto the inner circumferential side of the optical disk 1 when the tracking error signal Tr shows the level "+". The irradiating position of the laser spot is moved onto the outer circumferential side of the optical disk 1 when the tracking error signal Tr shows the level "−".

In this embodiment, the tracking control is executed in the control mode 1 in a processing step P03. At this time, the optical pickup tracks any one of the land portion L and the groove portion G in accordance with an electric circuit of the optical disk unit.

A regenerating signal is next detected. When recorded information is located in a tracking position, each of two detecting signals of the two-divisional light receiving element 422b is changed. The adding circuit 604 adds these two detecting signals to each other and outputs an added signal as a regenerating signal Rf. The signal regenerating section 606 converts this regenerating signal Rf to a binary signal and outputs this binary signal. In a processing step P04, the control section 607 judges existence or nonexistence of this regenerating signal Rf.

The control mode 1 is next switched to the control mode 2 and the tracking control is again executed in a processing step P05. For example, when the optical pickup tracks a land portion L in the control mode 1, a tracking position of the optical pickup is moved to a groove portion G adjacent to the land portion L. In contrast to this, when the optical pickup tracks a groove portion G in the control mode 1, the tracking position of the optical pickup is moved to a land portion L adjacent to the groove portion G. Next, existence or nonexistence of the regenerating signal Rf is judged in a processing step P06.

Thereafter, in a processing step P07, it is judged whether the regenerating signal Rf is detected by one of the above two tracking controls and is not detected by the other. If the regenerating signal Rf is detected in both the two tracking controls and is not detected in each of the two tracking controls (in the case of N in the processing step P07), an error is displayed in a processing step P08 and the operation of the optical disk unit is terminated. This case means breakdown of the optical disk unit, or means that no optical disk 1 is an optical disk explained with reference to FIG. 5.

In contrast to this, when the regenerating signal Rf is correctly detected in only one of the two tracking controls (in the case of Y in the processing step P07), the optical disk unit determines a tracking control condition with respect to the land portion L and the groove portion G. For example, as shown in FIG. 10a, when the regenerating signal Rf is detected in the control mode 1 and is not detected in the control mode 2, the tracking control is executed in the control mode 1 when the optical pickup gets access to the land portion L. The tracking control is executed in the control mode 2 when the optical pickup gets access to the groove portion G. In contrast to this, as shown in FIG. 10b, when the regenerating signal Rf is not detected in the control mode 1 but is detected in the control mode 2, the tracking control is executed in the control mode 2 when the optical pickup gets access to the land portion L. The tracking control is executed in the control mode 1 when the optical pickup gets access to the groove portion G. Thus, the tracking control condition is determined in a processing step P09.

Thereafter, read/write commands transmitted from a host computer are monitored in a loop shown by N (NO) of a processing step P10. In this embodiment, the read/write commands indicate whether an accessed object is the land portion L or the groove portion G together with a number of an information sector.

When the optical disk unit receives the read/write commands from the host computer as shown by Y (YES) in the processing step P10, the optical pickup 4 in a processing step P11 seeks a certain tracking position in which the corresponding information sector is located within a recording region 12. In a processing step P12, the tracking control is executed in a control mode corresponding to the land portion L or the groove portion G in accordance with the tracking control condition determined in the processing step P09. Thus, the optical pickup can reliably track the land portion L or the groove portion G in accordance with the read/write commands.

Thereafter, in a processing step P13, information is recorded to the corresponding information sector of the tracked land portion L or the tracked groove portion G. Further, the recorded information of this information sector is read. When this accessing operation is terminated, the operation of the optical disk unit is returned to the command monitoring operation in the processing step P10.

As mentioned above, as shown in FIG. 9, the optical disk unit in this embodiment has the two tracking control modes. In one of the two tracking control modes, the optical pickup tentatively tracks the land/groove discriminating region 11 of the optical disk 1. It is then judged whether a tracking position of the optical pickup is located in a land portion or a groove portion. Thus, it is judged whether the tracking control mode corresponds to the tracking position. Thereafter, when the land portion L or the groove portion G is commanded by the read/write commands, the tracking control is executed in accordance with this judging result.

Thus, it is possible to prevent the optical pickup from getting access to the land or groove portion in error.

A header portion 12a in the recording region 12 of the optical disk 1 is commonly used when the optical pickup gets access to the land portion L and the groove portion G. Therefore, the land portion and the groove portion cannot be discriminated from each other by address information of the header portion 12a. Accordingly, it is particularly necessary to reliably discriminate the land and groove portions from each other.

A prepit is formed in only the land portion L in the land/groove discriminating region 11. Thus, it is judged whether a tentative tracking position is located in the land or groove portion. Therefore, the tracking position can be reliably judged by a simple means.

In the above embodiment, no prepit in the land portion L in the land/groove discriminating region 11 shows meaningful information. However, this prepit may be set to show control information such as an operating condition of the optical disk. In a normal optical disk, the control information is recorded to a sector format part (SFP) as a control track, etc. However, in accordance with the above construction, it is possible to omit an operation for reading the control track.

FIG. 11 shows another embodiment of the optical disk 1. The differences in structure between FIGS. 5 and 11 are that there is no prepit in a land/groove discriminating region 11 and groove parts of a groove portion G are intermittently formed and adjacent groove parts are arranged in a zigzag shape in FIG. 11.

In this case, no regenerating signal Rf is detected when the optical pickup 4 tracks a land portion L in the land/groove discriminating region 11. The regenerating signal Rf is detected when the optical pickup 4 tracks a groove portion G. Thus, similar to the first embodiment, the land portion L and the groove portion G can be discriminated from each other.

For example, as shown in FIG. 12a, a width of the groove portion G may be set to be narrower than that of the land portion L in the land/groove discriminating region 11. In this case, a difference in reflectivity of a laser beam is caused between the land and groove portions. Accordingly, the land portion L and the groove portion G can be discriminated from each other by detecting the intensity difference in reflected light.

For example, if groove parts of the groove portion G are intermittently formed as shown in FIG. 12b, the intensity difference can be detected as a regenerating signal Rf when the optical pickup tracks the groove portion G.

In the embodiment shown in FIG. 5, a prepit is formed in the land portion L in the land/groove discriminating region 11. However, the prepit may be formed in the groove portion G. In FIGS. 12a and 12b, the groove portion G is set to be narrower than the land portion L, but the land portion L may be set to be narrower than the groove portion G.

In the above-mentioned embodiments, the optical disk 1 is set to a write-once type recording medium in a hole boring recording system. However, the present invention can be similarly applied to various kinds of optical disks each having a track guide groove. For example, the present invention can be applied to a rewriting type recording medium in a magnetooptic recording system or a phase-changing type recording system. Further, the present invention can be applied to an optical card or tape to which information is stored by the same principle.

As mentioned above, in accordance with the present invention, an optical pickup is tentatively tracked in a constant region of an optical disk in a constant control condition. It is judged whether a tracking position of the optical pickup is located in a land or groove portion. It is next judged by this judging result whether a tracking control condition corresponds to the tracking position. Thereafter, the optical pickup gets access to the optical disk in accordance with command information. Accordingly, it is possible to prevent the optical pickup from getting access to each of the land and groove portions in error.

An optical disk and an optical disk unit in accordance with another embodiment of the present invention will next be described with reference to FIGS. 13 to 17.

In FIG. 13, a semiconductor laser 701 constitutes a light source. A collimator lens 702, a beam splitter 703 and an objective lens 704 are sequentially arranged on a light emitting path between this semiconductor laser 701 and an optical disk 705. The collimator lens 702 changes light emitted from the semiconductor laser 701 to parallel light. The parallel light from the collimator lens 702 is transmitted through the beam splitter 703. Light reflected on the optical disk 705 is reflected on the beam splitter 703 in a rightward direction in FIG. 13. The objective lens 704 converges light transmitted through this beam splitter 703 and forms a light spot on the optical disk 705. A two-divisional light receiving element 706 is arranged on a reflecting optical path. The two-divisional light receiving element 706 receives diffracted light caused by the optical disk 705 and reflected on the beam splitter 703.

This two-divisional light receiving element 706 is connected to a differentiator 707 and an adder 708. The differentiator 707 generates a difference between signals a and b obtained from the two-divisional light receiving element 706. The adder 708 generates a sum of these signals a and b. The differentiator 707 is connected to a tracking signal selecting circuit 710. The adder 708 is connected to the tracking signal selecting circuit 710 through a tracking signal generating circuit 709. The tracking signal selecting circuit 710 is connected to a tracking motor driving circuit 711 for driving a tracking motor 712 based on a signal outputted from this tracking signal selecting circuit 710.

In the optical disk 705, positions of central lines of a pregroove and a prepit are shifted from each other as shown in FIGS. 16 and 17.

The track signal generating circuit 709 makes a predetermined calculation such as (a+b)−α with respect to an sum signal (a+b) obtained by the adder 708. The track signal generating circuit 709 generates a signal for performing a tracking operation in a prepit region from this predetermined calculation.

A difference signal (a−b) obtained by the differentiator 707 is used when the tracking operation is performed in a pregroove region. (a+b)−α obtained by the above predetermined calculation from the sum signal (a+b) is used when the tracking operation is performed in the prepit region. The tracking signal selecting circuit 710 switches the difference signal (a−b) and the signal (a+b)−α. Another signal (a−b)/(a+b) can be used instead of the difference signal (a−b) when the tracking operation is performed in the pregroove region.

An operation of the above optical disk unit in the present invention will next be explained.

A light beam is emitted from the semiconductor laser 701 as a light source and is changed to a parallel light beam by the collimator lens 702. The parallel light beam is transmitted through the beam splitter 703 and is incident to the objective lens 704. The incident light beam is converged by this objective lens 704 and is formed as a small light spot on the optical disk 705.

This light beam is diffracted and reflected on the optical disk 705 and is again transmitted through the objective lens 704. The light beam is then reflected on the beam splitter 703 in a rightward direction in FIG. 13. Thus, the light beam is incident to the two-divisional light receiving element 706 for detecting a tracking error signal by a method for detecting a change in diffracted light caused by the optical disk 705 such as a well-known push-pull method. This two-divisional light receiving element 706 converts the diffracted light caused by the optical disk 705 to electric signals a and b. The two-divisional light receiving element 706 outputs these electric signals a and b to the differentiator 707 and the adder 708. A difference signal (a–b) generated by the differentiator 707 is transmitted to the tracking signal selecting circuit 710. A sum signal (a+b) generated by the adder 708 is inputted to the tracking signal generating circuit 709 so that a predetermined calculation (a+b)–α is made. The tracking signal generating circuit 709 then generates a tracking signal for the prepit region. The tracking signal generating circuit 709 transmits the tracking signal and the calculated signal (a+b)–α to the tracking signal selecting circuit 710.

This tracking signal selecting circuit 710 selects the difference signal (a–b) when the tracking operation is performed in the pregroove region. The tracking signal selecting circuit 710 selects the calculated signal (a+b)–α provided from the tracking signal generating circuit 709 when the tracking operation is performed in the prepit region. A concrete explanation of the tracking signal selecting circuit 710 will next be described.

FIG. 16 shows a difference signal as a tracking signal and a sum signal outputted from the pregroove region. As shown in FIG. 16, the tracking operation is controlled at a zero crossing point p of the difference signal in a rightward rising direction when the tracking operation is performed in a groove G. The tracking operation is controlled at a zero crossing point q of the difference signal in a rightward falling direction when the tracking operation is performed in a land L. Namely, when the tracking operation is performed in the pregroove region, the difference signal from the differentiator 707 is selected by the tracking signal selecting circuit 710. This difference signal is transmitted to the tracking motor driving circuit 711. Thus, the tracking motor 712 is driven by the tracking motor driving circuit 711 with a desirable polarity, thereby performing the tracking operation.

FIG. 17 shows a difference signal and a sum signal outputted from the prepit region. The difference signal is equal to a local maximum value as shown by reference numeral r in FIG. 17 when the tracking operation is started by the difference signal on an extension line of a pregroove in the prepit region. Accordingly, no tracking operation can be controlled in this case. Further, the difference signal is equal to a local minimum value as shown by reference numeral s in FIG. 17 when the tracking operation is started on an extension line of a land. Accordingly, no tracking operation can be also controlled in this case. Therefore, the tracking operation is controlled by using the sum signal such that the sum signal is equal to α. The tracking operation is controlled by using a signal value t when the tracking operation is performed on the extension line of the pregroove. The tracking operation is controlled by using a signal value u when the tracking operation is performed on the extension line of the land. Namely, when the tracking operation is performed in the prepit region, a predetermined calculation such as (a+b)–α is made by the tracking signal generating circuit 709 with respect to the sum signal (a+b) from the adder 708. This subtracted signal value (a+b)–α is transmitted to the tracking motor driving circuit 711 through the tracking signal selecting circuit 710.

The tracking motor driving circuit 711 drives the tracking motor 712 with a desirable polarity to perform the tracking operation. The value α can be obtained by detecting the sum signal obtained immediately after an optical pickup is moved from the pregroove region to the prepit region.

An optical disk in accordance with another embodiment of the present invention will next be explained.

FIG. 14 shows the optical disk in this embodiment. As shown in FIG. 14, this optical disk is constructed by a pregroove region A and prepit regions B and C adjacent to this pregroove region A. The prepit region B is commonly used with respect to each of tracks. The prepit region B is arranged such that no prepit is shifted from a pregroove. The prepit region C is proper to each of the tracks. The prepit region C is formed such that prepits are shifted from each other by ¼ times the pitch of a pregroove.

A magnetooptic disk having 90 mm in diameter will next be explained concretely.

As shown in FIG. 15, a sector format of the magnetooptic disk having 90 mm in diameter is constructed by a header portion and a recording field portion. The header portion is constructed by a sector mark (SM), a VFO field (VFO), an address mark (AM) and an ID field (ID). Information almost having the same pattern is recorded to any one of tracks except fop ID. In this embodiment, the same pattern information such as SM, VFO, AM, etc. except fop ID is not dislocated from the extension line of a pregroove in the prepit region B common to each of the tracks. Only ID information proper to each of the tracks is arranged in the proper prepit region C by shifting prepits from each other by ¼ times the pitch of a pregroove. Thus, the tracking operation can be performed by using only the difference signal instead of the sum signal.

As mentioned above, in accordance with the present invention, the two-divisional light receiving element receives diffracted light caused by the optical disk. The tracking operation is performed on the basis of a difference signal or a sum signal of the two-divisional light receiving element. Thus, the tracking operation can be performed in an arbitrary position of the optical disk. Accordingly, a regenerating signal of a prepit is stabilized and the tracking operation is also stabilized with respect to the optical disk in which the prepit is located at each of centers of a pregroove and a land.

In the optical disk of the present invention, a prepit having the same pattern as an adjacent prepit is arranged on an extension line of the above pregroove in the prepit region. Prepits having a pattern different from that of the adjacent prepit are shifted from each other by ¼ times a pitch of the pregroove. Accordingly, a regenerating signal of a prepit is stabilized without using any special device and the tracking operation is also stabilized. Further, it is possible to provide an optical disk having a large capacity.

FIG. 18 is an perspective cross-sectional view partially showing an optical information recording medium in accordance with another embodiment of the present invention. FIG. 19 is a plan view of the optical information recording medium shown in FIG. 18. In these figures, reference numerals 801, 802 and 803 respectively designate a disk substrate, a land and a groove. Reference numerals 804, 805, 806 and 807 respectively designate a prepit, a recording pit, a laser converging beam and a light absorption reflective recording layer. As shown in FIGS. 18 and 19, the land 802 and the groove 803 are formed on a recording medium face as a region for recording and regenerating information. A series of prepits 804 including address information of respective data is also formed on the recording medium face. When a groove interval as a track pitch is set to P, the prepit series is arranged such that a central line of the prepit series is shifted from that of the groove 803 by P/4. The land 802 is arranged such that a central line of the land 802 is located between central lines of both grooves adjacent to this land 802. No groove is formed in a preformat region constructed by the prepit series and including address information.

Ranges of shapes of the groove 803 and a prepit 804 are prescribed from values of groove signal characteristics optically obtained by using the laser converging beam 806. FIGS. 20a to 20d are graphs respectively showing the relation between a groove shape and a groove level, the relation between a groove shape and a land level, the relation between a groove shape and a push-pull signal used for tracking, and the relation between a prepit shape and a prepit signal amplitude. The groove level in an unrecording state shows a reflected light intensity provided when the laser converging beam 806 scans the optical information recording medium on the central line of the groove 803. The land level in the unrecording state shows a reflected light intensity provided when the laser converging beam 806 scans the optical information recording medium on the central line of the land 802. In the optical information recording medium of the present invention, it is preferable to set the groove and land levels in the unrecording state to be close to each other as much as possible so as to record information to the groove 803 and the land 802. When there is a large difference between these groove and land levels, a difference in C/N between recording pits is caused.

Figure 20A:
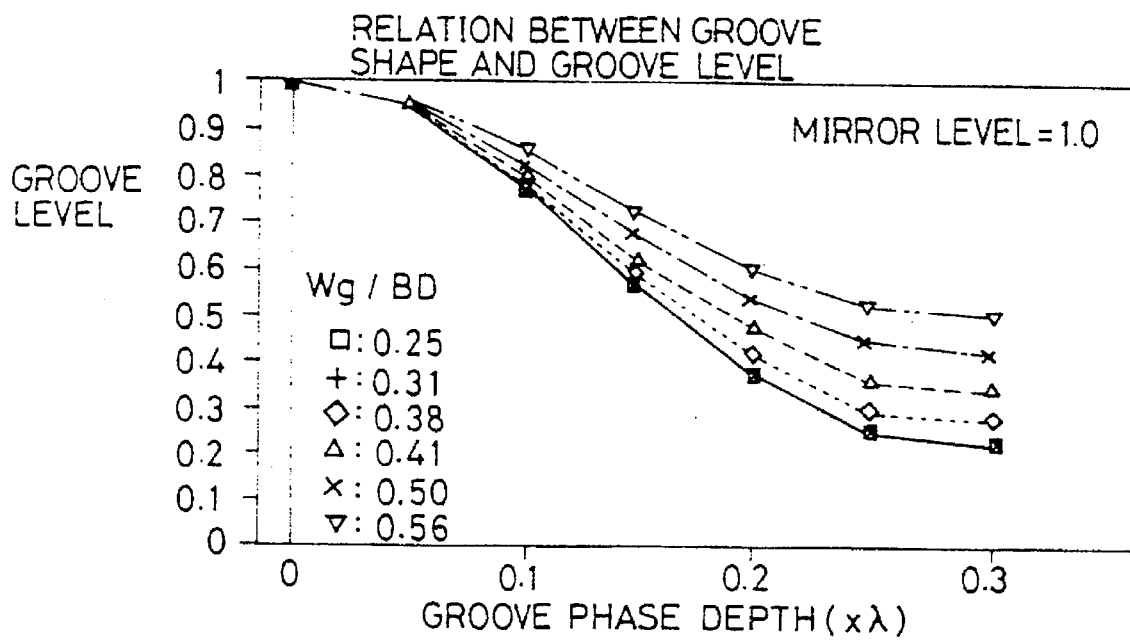
Figure 20B:
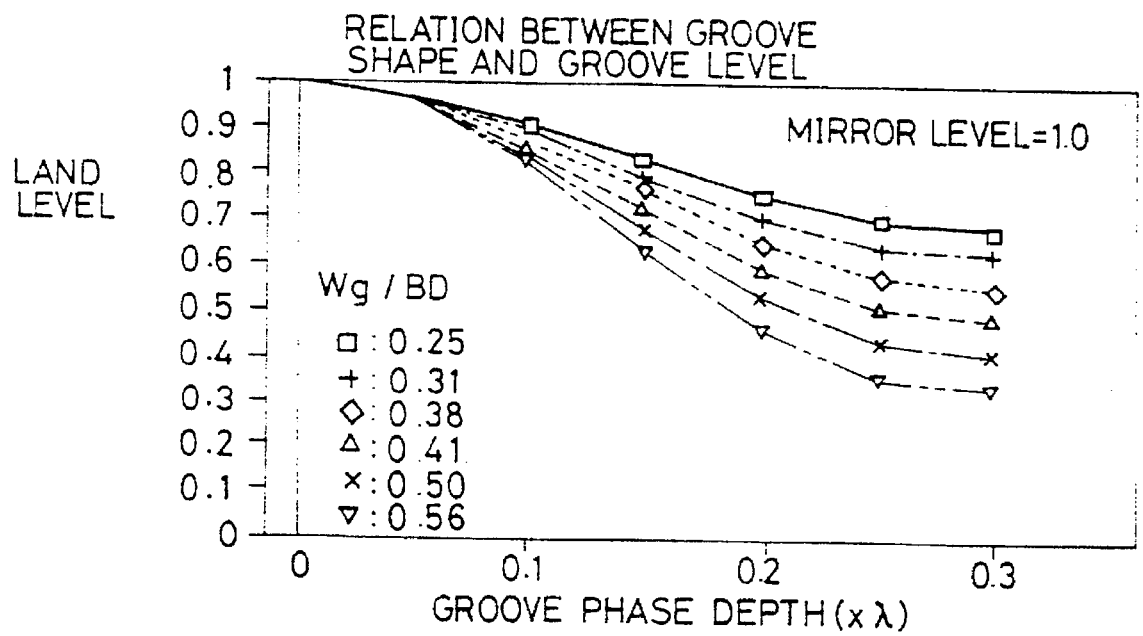

It should be understood from FIGS. 20a and 20b that the groove and land levels are approximately equal to each other when the groove shape satisfies the following conditions.

$$0.1 \times (2n+1)\lambda \leq Dg \leq 0.2 \times (2n+1)\lambda 0.38 \leq Wg/BD \leq 0.56$$

Figure 20C:
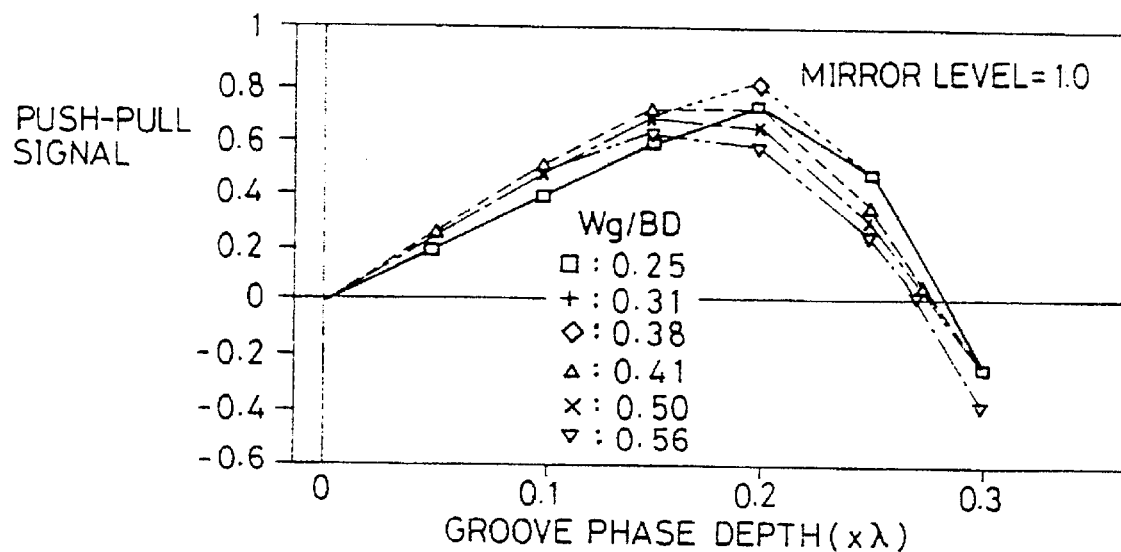

In these conditions, Dg is set to a phase depth of the groove and Wg is set to a half-value groove width with respect to the groove depth. BD is set to a diameter ($1/e^2$ value) of the laser converging beam fop recording and regenerating information. $\lambda$ is set to a wavelength of the laser converging beam. Value n is set to 0, 1, 2, - - - . Parameters showing the groove shape are defined as shown in FIG. 21b. In accordance with the groove shape satisfying the above conditions, a push-pull signal value from 0.4 to 0.7 is obtained as shown in FIG. 20c. This push-pull signal value is an output signal value causing no problem about a tracking servo operation.

The prepit shape is desirably formed in relation to a stamper manufacturing technique such that a phase depth Dp of the prepit is approximately equal to the phase depth Dg of the groove. The stamper manufacturing technique will be explained in another embodiment of the present invention described later. Further, the prepit shape desirably satisfies the following conditions.

$$0.1 \times (2n+1)\lambda \leq Dp \leq 0.2 \times (2n+1)\lambda 0.19 \leq Wp/BD \leq 0.44$$

Figure 20D:
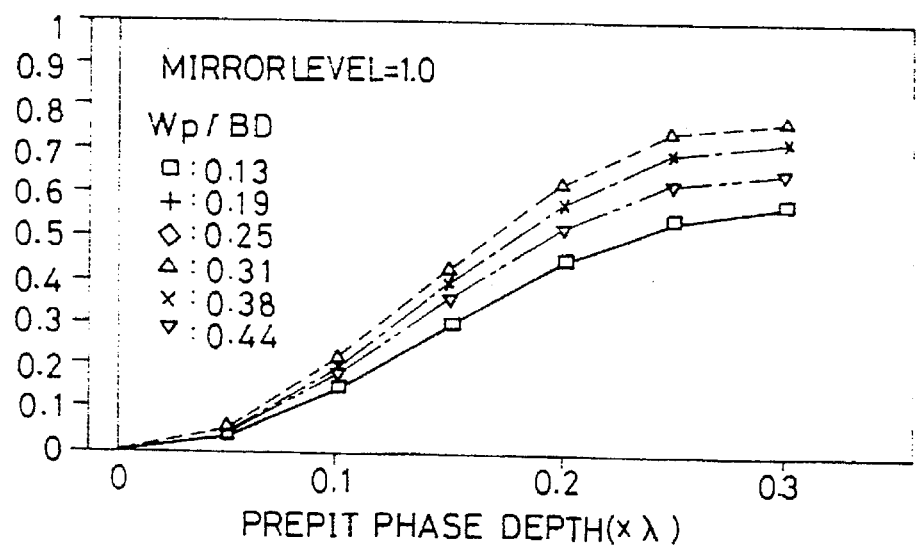

In these conditions, Wp is set to a half-value groove width with respect to the prepit depth. Parameters showing the prepit shape are defined as shown in FIG. 21a. In accordance with the prepit shape satisfying these conditions, a prepit signal amplitude value from 0.2 to 0.6 is obtained as shown in FIG. 20d so that no problem is caused in signal regeneration.

In the optical information recording medium of the present invention, a prepit format mark can be formed within the preformat region constructed by the prepit series. This prepit format mark can be constructed by a mirror mark portion in which the groove and the prepit do not exist. Otherwise, the prepit format mark can be constructed by a series of prepits having the same pattern and formed on central lines of the groove and the land. This preformat mark will be described in detail in the following explanation of a recording-regenerating method.

A method for recording and regenerating information from the above optical information recording medium will next be explained.

Each of FIGS. 22a and 22b shows a scanning locus of the laser converging beam when information is recorded and regenerated from the optical information recording medium of the present invention. FIG. 22a shows the scanning locus when information is recorded and regenerated with respect to the groove 803. FIG. 22b shows the scanning locus when information is recorded and regenerated with respect to the land 802. The laser converging beam scans the optical information recording medium on each of central lines of the groove 803 and the land 802 as regions for recording and regenerating information. However, the laser converging beam scans the optical information recording medium on the central line of the prepit series in the preformat region constructed by the prepit series. This is because no stable recording pit or prepit signal can be obtained and no recorded signal can be accurately regenerated when no laser converging beam scans the optical information recording medium on the central line of a recording pit in a data region or a prepit in the preformat region.

Accordingly, it is necessary to accurately detect a position of the preformat region so as to align the laser converging beam with the central line of the prepit series in the preformat region at preferable timing. Therefore, the optical information recording medium in the present invention has a preformat mark as a mark showing existence of a preformat in the preformat region. This preformat mark is called a PFM in the following description. It is desirable to accurately detect the preformat mark even in a state in which no tracking servo operation is performed. This is because it is necessary to perform a seeking operation without the tracking servo operation in regeneration of the data region of a certain address. When no preformat mark can be accurately detected in a state in which the tracking servo operation is stopped, no tracking servo operation can be again started immediately after the seeking operation so that no laser converging beam can be shifted at preferable timing in the preformat region.

Each of FIGS. 23a and 23b shows a preformat construction of the present invention used to accurately detect the preformat mark even in a state in which no tracking servo operation is performed.

In FIG. 23a, the preformat mark (PFM) is constructed by a mirror mark in which a groove 803 and a prepit 804 do not exist. In accordance with this mirror mark, a constant mirror output level can be obtained irrespective of existence and nonexistence of the tracking servo operation. Accordingly, the preformat mark can be accurately detected even when no tracking servo operation is performed.

In FIG. 23b, the preformat mark is arranged such that an interval between prepit series is equal to P/2 and a central line of each of the prepit series is equal to each of central lines of a groove 803 and a land 802. The prepit series of the preformat mark formed in each of tracks is constructed by the same pattern. In this case, the amplitude of a prepit signal obtained from the preformat mark can be stabilized without the tracking servo operation since the amplitude of a crosstalk signal from an adjacent track is large. Accordingly, if this preformat construction is used, a position of the preformat region can be accurately detected without the tracking servo operation.

When eccentricity of the optical information recording medium is large, it is necessary to perform the tracking servo operation toward a center of the prepit series. In this case, there is a problem that the laser converging beam is moved to the center of the prepit series so as to accurately scan the laser converging beam toward a center of each of the groove, the land and the prepit series.

FIG. 24 shows a data region constructed by the groove 803 and the land 802 and the waveform of a push-pull signal in this data region. FIG. 25 shows a preformat region constructed by the prepit series and the waveform of a push-pull signal in this preformat region.

As shown in FIG. 25, a central line of the prepit series is shifted from that of the groove 803 by P/4 so that the phase of a sine waveform of the push-pull signal is shifted from that in the case of FIG. 24 by $\pi/2$. Therefore, the push-pull signal is changed from 0 to −Vofs' in amplitude when the laser converging beam 806 is moved from the groove 803 to the prepit series in a state in which the tracking servo operation is performed. In this tracking servo state, the objective lens is moved in accordance with this change in the push-pull signal such that the amplitude of the push-pull signal is equal to zero. In this case, a tracking position of the laser converging beam 806 is preferably returned to the prepit series to be scanned. However, there is a possibility that the laser converging beam is shifted to a prepit series adjacent to the prepit series to be scanned.

To prevent such a problem from being caused, the tracking servo operation is stopped in the present invention after the data region constructed by the groove and the land has been completely scanned. The tracking servo operation is restarted when the prepit series begins to be scanned after the laser converging beam has been shifted to the central line of the prepit series by P/4. In this method, the tracking servo operation can be accurately restarted on the central line of the prepit series without any influence of the change in the push-pull signal when the laser converging beam is moved from the groove to the prepit series. The above change in the push-pull signal is also caused in an operation for switching the tracking operation from the prepit series to the groove. Therefore, the tracking servo operation is stopped when the prepit series has been completely scanned. The tracking servo operation is started when the groove begins to be scanned after the laser converging beam has been shifted to a central line of the groove by P/4. FIG. 26 shows a timing chart of this tracking switching operation.

This tracking switching operation is concretely performed as follows. Namely, an Rf signal of an electric circuit as a sum signal is regenerated and a preformat mark (PFM) is detected by a PFM decoder. Further, a PFM window signal A is generated. A header window signal B is generated from the PFM window signal A. A preformat window signal C is generated by using the PFM window signal A and the header window signal B. A tracking servo ON/OFF switching signal D is generated from a combination of delay circuits of the PFM window signal A. The tracking servo ON/OFF switching signal D is used to stop the tracking servo operation before and after a preformat. It is necessary to apply a voltage corresponding to Vofs or −Vofs shown in FIG. 24 to an actuator for moving the objective lens so as to shift the laser converging beam by P/4 before and after a prepit series. Therefore, the voltage corresponding to each of Vofs and −Vofs in FIG. 24 is sample-held. A track offset signal E is generated from this voltage signal and the tracking servo ON/OFF switching signal D. FIG. 26 shows a timing chart of such signals. FIG. 27 is a block diagram of an electric circuit for generating the respective signals A to E shown in the timing chart of FIG. 26.

FIG. 28 is a block diagram of a tracking servo circuit for performing the tracking servo operation in the recording-regenerating method of the present invention. In this tracking servo circuit, a tracking servo ON/OFF switching operation is performed by using the above tracking servo ON/OFF switching signal D. The track offset signal E is additionally applied to the actuator for moving the objective lens so as to shift the laser converging beam by P/4. In the optical information recording medium of the present invention, it is necessary to record information to a groove and a land. Therefore, an electric circuit for switching land (L)/groove (G) tracking polarities is included in FIG. 28. The L/G tracking polarities are switched by a driving signal from a host controller for controlling record and regeneration of information in accordance with necessity. A divided push-pull signal may be used instead of a push-pull signal used for the tracking servo operation. The push-pull signal is briefly described as PP in FIG. 28 and the divided push-pull signal is briefly described as DPP in the following description. The DPP signal is divided and standardized by an output of the PP signal. It is possible to remove disturbance factors such as a change in reflectivity of the optical information recording medium, a change in light amount of a laser diode, etc. by using this divided push-pull (DPP) signal. Accordingly, the tracking servo operation can be reliably started.

It is not necessary to perform the tracking servo operation within one preformat region if eccentricity of the optical information recording medium is small to such an extent that this eccentricity can be neglected within this preformat region. In this case, it is sufficient to perform the tracking servo ON/OFF switching operation by using the preformat window signal C shown in FIG. 27.

FIG. 29 is a timing chart of signals provided when the tracking servo ON/OFF switching operation is performed by using this preformat window signal C. While the tracking servo operation is stopped, an offset voltage Vofs is additionally applied to the actuator for moving the objective lens so as to approximately scan the laser converging beam on the central line of a prepit series within a header region. FIG. 30 is a block diagram of an electric circuit for generating a track offset signal E' at preferable timing. FIG. 31 is a block diagram of the tracking servo circuit shown in FIG. 28 when the preformat window signal C shown in FIG. 29 is used as a tracking servo signal and the track offset signal E' shown in FIG. 29 is used as a track offset signal.

The track offset signal E' in FIG. 29 may be set to be zero in voltage at any time if eccentricity of the optical information recording medium is small to such an extent that this eccentricity can be neglected within one preformat region. Namely, this means that the laser converging beam scans the optical information recording medium on the central line of a groove or a land instead of the central line of the prepit series. Each of FIGS. 32a and 32b shows a state in which preformat information constructed by the prepit series is regenerated by scanning the laser converging beam on the central line of the groove or the land. In this case, it is not necessary to arrange a peak hold circuit and a track offset pulse generating circuit shown in FIG. 30. Further, no input of the signal E' is required in FIG. 31. The amplitude of a prepit signal regenerated in a state shown in each of FIGS. 32a and 32b is smaller by about 10% than the amplitude of a prepit signal regenerated in a state shown in each of FIGS. 22a and 22b. This is because the prepit signal is regenerated in a state in which the laser converging beam is shifted from the central line of the prepit series by P/4. However, a sufficiently large prepit signal amplitude can be obtained in the optical information recording medium of the present invention. Accordingly, no problem about signal regeneration is caused even when the prepit signal amplitude is reduced by about 10%.

The next explanation relates to a method for manufacturing a stamper for manufacturing a substrate in the optical information recording medium constructed above and an original board exposure apparatus.

Figure 33A:
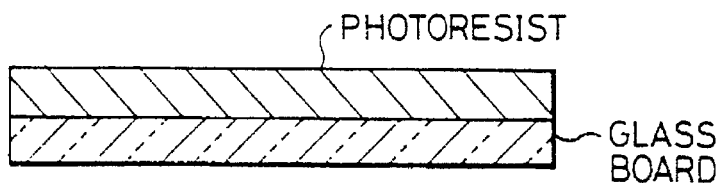
Figure 33B:
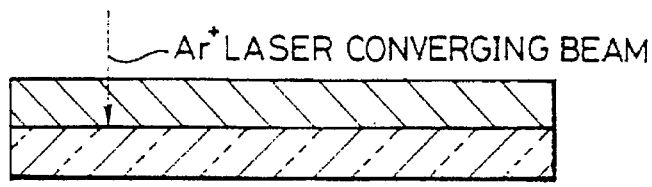
Figure 33C:
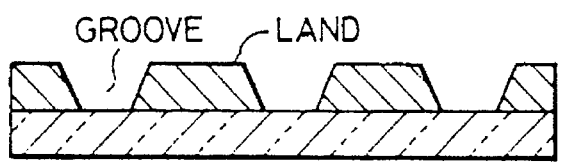
Figure 33D:
Figure 33E:
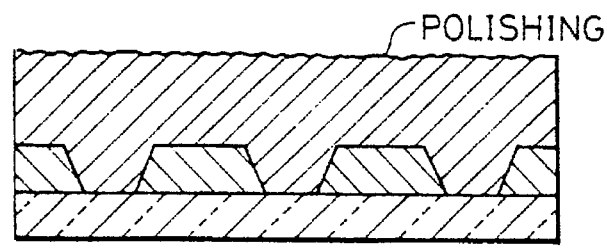
Figure 33F:
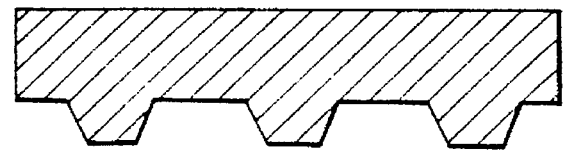
Figure 33G:
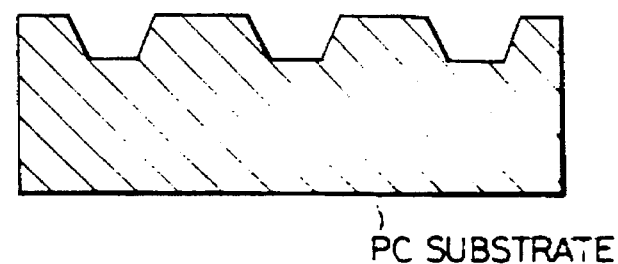

Normally, an irregular substrate of the optical information recording medium is constructed by a polycarbonate (PC) substrate transferred from a die called a stamper by an injection molding method. FIGS. 33a to 33g show a general manufacturing flow of this stamper. In FIG. 33a, a photoresist is formed on a glass board by spin coating. In the following description, this glass board having the photoresist is called a resist original board. While this resist original board is rotated, an argon $Ar^+$ laser converging beam is scanned onto the resist original board in a concentric or spiral shape. Thus, a latent image is formed on the photoresist as shown in FIG. 33b. This latent image is next developed and an irregular pattern is formed on the photoresist as shown in FIG. 33c. Next, a nickel (Ni) sputtering film is formed as a conductive film on this photoresist face as shown in FIG. 33d. Further, as shown in FIG. 33e, the resist original board having the nickel film is laminated and formed by an electrocasting method such that an electrocasting plate as a laminated film has about 0.3 mm in thickness. Next, this nickel electrocasting plate is polished and processed to set inside and outside diameters thereof required at a molding time. Further, a cleaning operation of the nickel electrocasting plate such as removal of the photoresist is performed. Thus, a nickel stamper is completely manufactured as shown in FIG. 33f. A polycarbonate (PC) substrate transferred from this nickel stamper by the injection molding method has an irregular shape inverted to that of the stamper. As shown in FIG. 33g, the polycarbonate substrate approximately has the same shape as the irregular shape formed on the photoresist face.

An exposure apparatus for the photoresist original board forms a groove, a land and a prepit series shown in FIG. 23a on the photoresist by using an argon $Ar^+$ laser converging beam. This exposure apparatus is called an original board exposure apparatus in the following description. FIG. 34 is a block diagram showing an optical system of the original board exposure apparatus. FIG. 35 is a timing chart for controlling the argon $Ar^+$ laser converging beam. The optical system of the original board exposure apparatus shown in FIG. 34 is characterized in the following four points.

(1) One argon $Ar^+$ laser converging beam is used to form the groove and the prepit series.

(2) The optical system of the original board exposure apparatus has a signal modulator 823 for continuously irradiating the laser converging beam in formation of the groove. The signal modulator 823 is also used to irradiate and interrupt the laser converging beam in conformity with a pattern of the prepit series when the prepit series is formed.

(3) The optical system of the original board exposure apparatus has a light amount modulator 825 for changing a light intensity of the laser converging beam by each of grooves to form a groove and a prepit having different groove widths.

(4) The optical system of the original board exposure apparatus has an optical deflector 827 for deflecting the laser converging beam to form a groove and a prepit series on different central lines.

In FIG. 34, reference numerals 821, 822 and 824 respectively designate a pin hole portion, a $\lambda/2$ polarizing plate and a mirror. Reference numerals 826, 828 and 829 respectively designate a pin hole portion, a beam expander and a mirror. Reference numerals 830 and 831 respectively designate a $\lambda/4$ polarizing plate and a polarizing beam splitter (PBS). Reference numeral 832 designates an objective lens and a focusing actuator. Reference numerals 833 and 834 respectively designate a glass board having a photoresist and a turntable.

As shown by the timing chart of FIG. 35 for controlling the argon $Ar^+$ laser converging beam, turning-on and turning-off operations of a signal provided to the signal modulator 823 are switched in conformity with the groove and the prepit series shown in FIG. 35. This signal modulator 823 is called D A/O in the following description. An input voltage of a signal provided to the light amount modulator 825 is set to $V_1$ when the groove is exposed. The light amount modulator 825 is called A A/O in the following description. This input voltage is set to $V_2$ when the prepit is exposed. The voltage $V_1$ is set to be greater than the voltage $V_2$. As a result, a light intensity Pg of the laser converging beam at the exposing time of the groove is greater than a light intensity Pp of the laser converging beam at the exposing time of the prepit. Namely, $V_1 > V_2$ is formed so that Pg>Pp is formed. An input voltage of a signal provided to the optical modulator 827 is set to 2.5 V when the groove is exposed. This input voltage is set to $W_1$ when the prepit is exposed. The optical modulator 827 is called W A/O in the following description. The argon $Ar^+$ laser converging beam is deflected on a photoresist face in accordance with a voltage value inputted to this optical modulator 827. A difference between the input voltage $W_1$ and 2.5 V is set to P/4 as a position of the argon $Ar^+$ laser converging beam on the photoresist face. Namely, W−2.5 (V) is set to show a beam position difference of P/4.

A groove, a land and a prepit series shown in FIG. 23a can be formed on the photoresist original board by using two argon $Ar^+$ laser converging beams. FIG. 36 is a block diagram showing an optical system of an original board exposure apparatus when these two argon $Ar^+$ laser converging beams are used. FIG. 37 is a timing chart for controlling each of the argon $Ar^+$ laser converging beams. In FIGS. 36 and 37, constructional elements similar to those shown in FIGS. 34 and 35 are designated by the same reference numerals. This optical system of the original board exposure apparatus is characterized in a half mirror 835, a signal modulator (D A/O) 823, a light amount modulator (A A/O) 825, an optical deflector (W A/O) 827, a signal modulator (D A/O) 837, a light amount modulator (A A/O) 838, etc. The half mirror 835 divides the laser beams into two light beams composed of a beam 1 for exposing a groove and a beam 2 for exposing a prepit. An optical system of the beam 1 has the signal modulator (D A/O) 823, the light amount modulator (A A/O) 825 and the optical deflector (W A/O) 827. The signal modulator (D A/O) 823 intermittently forms the groove. The light amount modulator (A A/O) 825 adjusts a light intensity of the beam 1. The optical deflector (W A/O) 827 sets a distance between the beams 1 and 2 on a photoresist face to P/4. An optical system of the beam 2 has the signal modulator (D A/O) 837 and the light amount modulator (A A/O) 838. The signal modulator (D A/O) 837 performs a signal modulation with respect to the argon $Ar^+$ laser converging beam 2 in conformity with the pattern of a prepit series. The light amount modulator (A A/O) 838 adjusts a light intensity of the beam 2.

In FIG. 36, reference numerals 835, 836 and 839 respectively designate a half mirror, a mirror and a pin hole portion. Reference numerals 840, 841 and 842 respectively designate a beam expander, a mirror and a half mirror.

As shown in the timing chart of FIG. 37, turning-on and turning-off operations of a signal provided to each of the signal modulators (D A/Os) 823 and 837 are switched in conformity with the groove or the prepit with respect to each of the beams 1 and 2. Further, a voltage provided to each of the light amount modulators (A A/Os) 825 and 838 is set in conformity with a light intensity required to expose the groove or the prepit.

In accordance with a timing chart shown in FIG. 38, a groove, a land, a preformat mark (PFM) and a prepit series in a header region shown in FIG. 23b are formed in a photoresist original board. In this case, the optical system of the original board exposure apparatus shown in FIG. 36 is also used. The differences between the cases of FIGS. 23a and 23b are that the prepit series of the preformat mark (PFM) is located on each of central lines of the groove and the land in FIG. 23b. A signal modulation with respect to each of the beams 1 and 2 is performed by each of the signal modulators (D A/Os) 823 and 837 in conformity with a pattern of the groove or the prepit. It is necessary to form a groove and a prepit having different groove widths with respect to the beam 1. Therefore, voltages $V_1$ and $V_2$ are switched and inputted to the light amount modulator (A A/O) 825 to switch the light intensity of the beam 1 in a groove region and a preformat region constructed by the prepit series. With respect to the light intensity of the beam 2, a voltage $V_3$ is set to the light amount modulator (A A/O) 838 to form the same shape as a prepit shape formed by the beam 1. A distance on the photoresist face between the beams 1 and 2 is set to P/2 in groove and preformat mark (PFM) portions. 2.5 (V) is set to the optical modulator (W A/O) 827 in the groove and a voltage W1 (V) is set to this optical modulator in the prepit series so as to shift the prepit series from a center of the groove by P/4.

A manufacturing example of the optical information recording medium in the present invention will next be described.

In this example, preformat information is based on an ISO standard format of a magnetooptic disk having each of diameters 90 mm and 130 mm (90 mm: ISO/IEC10090, 130 mm: ISO/IEC DIS10089). The magnetooptic disk is manufactured as follows.

First, a photoresist original board is manufactured by the manufacturing method shown in FIGS. 33a to 33g in the following conditions.

Manufacturing Conditions of the Photoresist Original Board

Glass substrate

A glass substrate has 6 mm in thickness and 250 mm in diameter φ.

Photoresist

A photoresist is formed by diluting OFPR 800 (manufactured by TOKYO APPLIED CHEMICAL in Japan) having viscosity 2 cp with thinner to 60%.

Film formation

A film is formed by a spin coating method.

First rotation 150 rpm, 20 sec

Second rotation 400 to 450 rpm, 90 sec

Prebake 90° C., 30 min

Original board exposure

The number of rotations of a table is set to 300 rpm.

An exposure light amount in the case of radius r=30 mm is set as follows with respect to a groove and a prepit.

Groove 4.0 mW

Prepit 2.0 mW

Developing liquid

A developing liquid is formed by diluting DE-3 (manufactured by TOKYO APPLIED CHEMICAL in Japan) to 33%.

Contents of a spin developing method are as follows.

Development 500 rpm, 60 sec

Pure water rinse 500 rpm, 180 sec

Dry 1000 rpm, 30 sec

Post bake 130° C., 30 min

The optical system of the original board exposure apparatus is constructed by one-beam exposure optical system shown in FIG. 34. A track pitch is set to P=1.6 μm. A distance between the central lines of a groove and a prepit series is set to P/4=0.4 μm. An argon $Ar^+$ laser wavelength is set to 457.9 nm. A numerical aperture (NA) of an objective lens is set to 0.9. Signals encoded on the basis of an ISO standard format are used as signals inputted to a signal modulator (D A/O), a light amount modulator (A A/O) and an optical deflector (W A/O). Shapes of a groove and a prepit manufactured by the above manufacturing conditions are formed as follows.

Groove Dg=900 to 1000 Å, Wg=0.7 to 0.8 (μm)

Prepit Dp=900 to 1000 Å, Wp=0.3 to 0.4 (μm)

Depths of the groove and the prepit are set to be equal to each other and are also set to be equal to the thickness of a photoresist film coated and formed on a photoresist original board. As shown in FIGS. 33a and 33b, each of the groove and the prepit has a trapezoidal groove shape in cross section. A light intensity distribution of the argon $Ar^+$ laser converging beam is provided as a Gaussian distribution. Accordingly, when a groove having a depth smaller than the thickness of the photoresist film is formed, this groove has only a V-shape or a U-shape. When the groove or the prepit has a V-shape or a U-shape in cross section, no preferable recorded and regenerated signals can be obtained with respect to the optical information recording medium. Accordingly, it is necessary to set a sectional shape of each of the groove and the prepit to be trapezoidal. Therefore, in this embodiment, the sectional shape of each of the groove and the prepit is set to be trapezoidal.

A stamper is manufactured by the manufacturing method shown in FIGS. 33a to 33g in the following conditions by using the photoresist original board manufactured above.

Manufacturing Conditions of the Stamper

A DC sputtering film is made of nickel (Ni) and has about 500 Å in thickness.

Electrocasting

An electrocasting liquid is constructed by nickel sulfamic acid.

An electrocasting plate has about 0.3 mm in thickness after electrocasting.

Polishing

The plate has a surface roughness equal to or smaller than Rmax0.3 μm after polishing.

A polycarbonate (PC) substrate is manufactured by an injection molding method using the stamper manufactured above. A dielectric layer of $ZnSiO_2$, a recording film of TbFeCo, a dielectric layer of $ZnSiO_2$, a reflecting film of aluminum (Al) and an ultraviolet (UV) hardened resin film as a protective layer are sequentially laminated and formed on this polycarbonate substrate. A magnetooptic disk is thus manufactured.

In this embodiment, the magnetooptic disk is manufactured. However, the present invention is not limited to the magnetooptic disk. For example, the present invention can be also applied to a write-once type optical recording medium using each of a cyanine coloring matter, a phthalocyanine coloring matter and a naphthalocyanine coloring matter, and an optical recording medium of a phase changing type using GeSbTe, etc.

Recording and regenerating results of information recorded and regenerated from the magnetooptic disk manufactured above will next be explained.

A recording operation is performed by a normal recording method and a regenerating operation is performed in the following conditions.

Regenerating Conditions

With respect to an optical pickup (PU), a semiconductor laser has a wavelength of 780 nm.

Power of a regenerating laser is set to about 1.0 mW.

The number of rotations of the disk is set to 1800 rpm.

In this embodiment, information is regenerated in a state in which a tracking servo operation is performed in a data region constructed by a groove and a land and is not performed in a prepit region constructed by a prepit. In a preformat region, information is regenerated without shifting a laser converging beam to the center of a prepit series. When information is regenerated on the groove, a scanning locus of the laser converging beam in a data region and a header region including preformat information and constructed by the prepit series is provided as shown in FIG. 39. An offset defection flag (ODF) constructed by a mirror face is used as a preformat mark (PFM) for detecting a position of the preformat region (see FIG. 41). As shown in FIG. 40, a tracking servo ON/OFF switching signal C is obtained from a detecting signal of this flag by the same means as FIG. 30. A tracking servo switching operation is performed by this tracking servo ON/OFF switching signal C in the data region and the preformat region by using a tracking servo circuit shown by a tracking servo block diagram in FIG. 43.

Information is regenerated on a land as shown in FIG. 40. In this case, only L(land)/G(groove) tracking polarities shown in FIG. 43 are switched.

Measured results of respective signals measured in a header portion in the above embodiment are provided as follows.

When information is regenerated on a groove (in the case of FIG. 39), the measuring results are provided as follows.

Groove level $Ig/(I_1+I_2)a=0.6$ to 0.7

Sector mark $Ism/(I_1+I_2)a=0.5$ to 0.6

VFO $Ivfo/(I_1+I_2)a=0.3$ to 0.4

When information is regenerated on a land (in the case of FIG. 40), the measuring results are provided as follows.

Land level $Il/(I_1+I_2)a=0.55$ to 0.65

Sector mark $Ism/(I_1+I_2)a=0.5$ to 0.6

VFO $Ivfo/(I_1+I_2)a=0.3$ to 0.4

A size of the sector mark and a signal amplitude of the VFO measured by scanning the laser converging beam at the center of a prepit series are respectively shown by $Ism/(I_1+I_2)a=0.55$ to 0.65 and $Ivfo=0.34$ to 0.43. In this embodiment, it is confirmed that the signal amplitude is reduced by only about 10%.

If information is recorded and regenerated as mentioned above by using the optical information recording medium in this embodiment, a recording capacity can be doubled in comparison with a general optical information recording medium since information can be recorded to both a groove and a land. Accordingly, a track pitch of each of the groove and the prepit series can be set to be sufficiently wider than the diameter of a regenerating beam. Therefore, no amplitude of a preformat signal is reduced by a crosstalk signal so that preformat information can be accurately regenerated.

In accordance with the present invention, the following notable effects can be obtained by the above construction of the optical information recording medium and the recording-regenerating method.

(1) One prepit series is commonly provided in one set of data tracks having a groove and a land so that an information recording density can be increased. Further, the density of a prepit formed in a preformat region can be set to be smaller than the density of a recording pit recorded to a data region so that regenerating reliability of preformat information is improved.

(2) Optical phase depths of the groove and the prepit are set to be equal to each other. Accordingly, when a stamper for manufacturing a polycarbonate (PC) substrate is exposed as an original board, the groove and the prepit having a trapezoidal shape can be simultaneously exposed. Therefore, it is possible to obtain a recording medium having a substrate onto which an irregular shape is accurately transferred.

(3) An optically regenerable prepit signal amplitude can be obtained by only adjusting a groove width of the prepit so that a stamper manufacturing method including exposure of an original board can be simplified.

(4) A groove and a land providing a small difference between optical signals can be obtained by only adjusting a width of the groove so that a stamper manufacturing method including exposure of an original board can be simplified.

(5) A preformat is constructed such that a change in signal amplitude is small even when no laser converging beam is located at the center of a track to be regenerated. Accordingly, a signal indicative of the position of a preformat region can be detected irrespective of existence and nonexistence of a tracking servo.

(6) Tracking servo states can be switched in a data region constructed by a groove and a land and a preformat region constructed by a prepit series. Accordingly, it is possible to realize a tracking servo for preventing a track servo shift and a jump onto an adjacent track caused by shifting a central line of the prepit series from a central line of the groove by P/4.

(7) A signal output indicative of the position of a preformat region can be obtained by using an optical information recording medium having a preformat mark. Accordingly, a tracking servo switching signal for switching tracking servo states can be accurately generated from this signal output in the preformat region.

(8) The construction of an optical system of an original board exposure apparatus can be simplified by using a technique for exposing and shaping a groove and a prepit as an original board by one laser converging beam.

(9) The construction of a signal generating circuit for executing laser beam control (irradiation and light interruption, and light amount adjustment) for exposing a groove and a prepit in an original board exposure apparatus can be simplified by adopting a technique using one laser beam for exposing the groove and one laser beam for exposing the prepit.

(10) The construction of a signal generating circuit for executing laser beam control in an original board exposure apparatus can be simplified by adopting a technique using one laser beam for exposing a groove and a prepit series and one laser beam for exposing the prepit series located on the central line of a land.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series, wherein a phase of depth Dp of a prepit and a phase depth Dg of a groove are approximately equal to each other and are ranged from $0.1 \times (2n+1)\lambda$ to $0.2 \times (2n+1)\lambda$ where n is set to 0, 1, 2, - - -, and $\lambda$ is set to a wavelength of a laser converging beam for recording and regenerating information.

2. An optical information recording medium as claimed in claim 1, wherein a preformat mark constructed by a mirror mark portion having no groove and no prepit is formed within the preformat region constructed by the prepit series.

3. An optical information recording medium as claimed in claim 1, wherein a preformat mark having the same pattern and constructed by the prepit series on each of central lines of a groove and a land is formed within the preformat region constructed by the prepit series.

4. An optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series, wherein the relation between a half-value groove width Wp with respect to a prepit depth and a diameter BD of a laser converging beam for recording and regenerating information is set to $0.19 \leq Wp/BD \leq 0.44$ where BD is set to $1/e^2$ value.

5. An optical information recording medium as claimed in claim 4, wherein a preformat mark constructed by a mirror mark portion having no groove and no prepit is formed within the preformat region constructed by the prepit series.

6. An optical information recording medium as claimed in claim 4, wherein a preformat mark having the same pattern and constructed by the prepit series on each of central lines of a groove and a land is formed within the preformat region constructed by the prepit series.

7. An optical information recording medium having a groove and a prepit series for tracking and constructed such that a central line of the prepit series is approximately shifted from a central line of the groove by P/4 on one of left-hand and right-hand sides when P is set to a distance between grooves; and no groove is formed in a preformat region constructed by the prepit series, wherein the relation between a half-value groove width Wg with respect to a groove depth and a diameter BD of a laser converging beam for recording and regenerating information is set to $0.38 \leq Wg/BD \leq 0.56$ where BD is set to $1/e^2$ value.

8. An optical information recording medium as claimed claim in claim 7, wherein a preformat mark constructed by a mirror mark portion having no groove and no prepit is formed within the preformat region constructed by the prepit series.

9. An optical information recording medium as claimed in claim 7, wherein a preformat mark having the same pattern and constructed by the prepit series on each of central lines of a groove and a land is formed within the preformat region constructed by the prepit series.

* * * * *

UNITED STATES PATENT AND TRADEMARK OFFICE
CERTIFICATE OF CORRECTION

PATENT NO. : 5,638,354
DATED : June 10, 1997
INVENTOR(S) : Masahiko Nakayama, et al.

It is certified that error appears in the above-identified patent and that said Letters Patent is hereby corrected as shown below:

On the cover page, lines 5-7 of the left column should read:

--[75] Inventors: Masahiko Nakayama and Akihiko Shimizu, both of Yokohama, Japan--.

Signed and Sealed this

Third Day of November, 1998

*Attest:*

BRUCE LEHMAN

*Attesting Officer*    *Commissioner of Patents and Trademarks*